Fig. 7

| TRANSFORMER | WINDING | RELATIVE RATED VOLTAGE |
|---|---|---|
| TM | T1 | $\sqrt{3}$ |
| TM | T2 | $2\sqrt{3}$ |
| TM | T3 | $\sqrt{3}$ |
| TN | T1 | 3.0 |
| TN | T2 | 3.0 |
| TO | T1 | $2\sqrt{3}$ |
| TO | T2 | $\sqrt{3}$ |
| TO | T3 | $\sqrt{3}$ |
| TP | T1 | 3.0 |
| TP | T3 | 3.0 |
| TQ | T1 | $\sqrt{3}$ |
| TQ | T2 | $\sqrt{3}$ |
| TQ | T3 | $2\sqrt{3}$ |
| TR | T2 | 3.0 |
| TR | T3 | 3.0 |

United States Patent Office 3,491,282
Patented Jan. 20, 1970

3,491,282
STATIC INVERTER WHEREIN A PLURALITY OF SQUARE WAVES ARE SO SUMMED AS TO PRODUCE A SINUSOIDAL OUTPUT WAVE
Theodore M. Heinrich, American Township, Allen County, and Andress Kernick, Lima, Ohio, assignors to Westinghouse Electric Corporation, East Pittsburgh, Pa., a corporation of Pennsylvania
Filed June 19, 1961, Ser. No. 117,966
Int. Cl. H04m 7/04
U.S. Cl. 321—5      25 Claims

This invention relates generally to power inverting devices and more particularly, to static inverting devices which produce an output wave shape which closely approximates a sine wave.

An object of this invention is to provide an inverter which will produce an output wave having a minimum of harmonics.

Another object is to provide such an inverter which does not require a filter network.

Another object is to provide such an inverter having a polyphase power output.

Another object is to provide such an inverter which utilizes a minimum of parts, occupies a minimum of space and is of minimum weight.

Other objects will be apparent from the description, the appended claims and the drawings, in which drawings:

FIG. 7 illustrates, in schematic form, preferred circuits for certain of the elements shown in block form in FIG. 6A;

An inverter is inherently a square voltage wave generating device and many current consuming devices operate most efficiently with a sine voltage wave. In prior art devices, either the sine wave was used thereby reducing the operating efficiency of the load device, or a relatively massive filter was used to filter out the lower harmonics. In accordance with this invention a plural number of square wave generators are connected in series and actuated in sequence so that the stepped output voltage approximates a sine wave and contains a minimum of the lower harmonics.

In one form of the invention, the output voltage wave $\phi A$ is derived from four individual square waves 216°, 252°, 288° and 324° provided by individual inverter or power stages arranged relative to each other in phase and magnitude as to provide a total voltage which when integrated over a half cycle is equal to a sine wave of a desired maximum value. This results in the neutralization of certain of the harmonics of the output wave without the imposition of massive and expensive filter networks. As will become apparent as the description proceeds, the greater the number of power stages or drivers the greater the number of harmonics which may be neutralized. If a polyphase output is desired the same power stages may be utilized for more than one of the output phases thereby permitting a more economical use of the apparatus.

Figure 1:
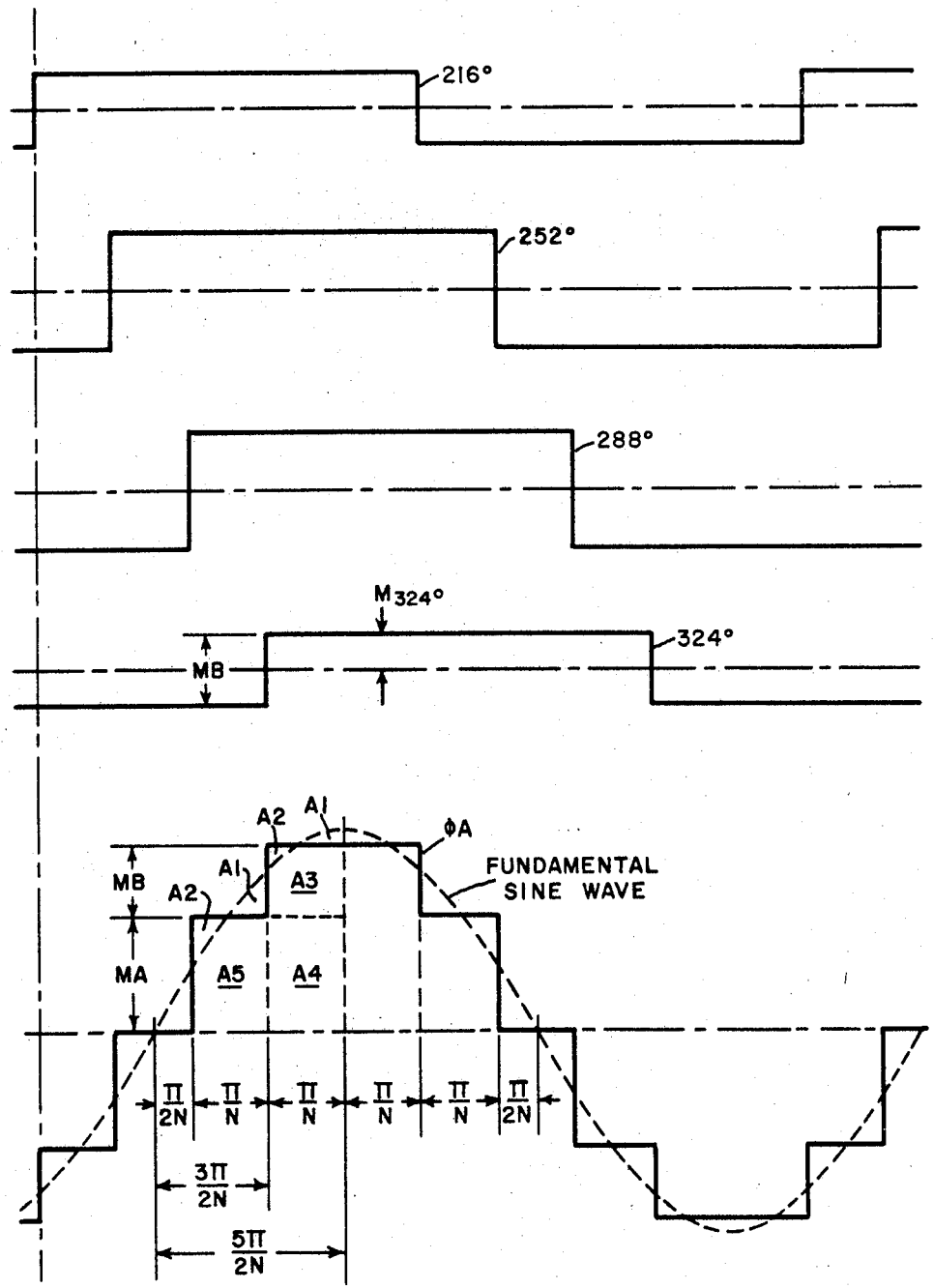
FIGURE 1 is a view showing the relative phases and magnitudes of four component voltages which may be combined together to provide one output phase of a five stage three phase inverter together with the resulting wave shape.

Referring to FIG. 1 if the areas below the illustrated positive half cycle of the stepped curve $\phi A$ is to equal the area under the superimposed half cycle of the sine wave, the areas A1 and A2 for each step of the stepped curve which lie inside and outside of the sine wave must be equal. The relative values as distinguished from the absolute values of the square waves which may be combined to provide a stepped wave which approximates a sine wave are independent of the maximum amplitude of the simulated sine wave which for purposes of simplicity, will be assumed to be unity. It is to be remembered, however, that it may be of any desired value and by a simple multiplication of all the relative values by the factor that the sine wave varies from unity the absolute value may be ascertained.

In FIG. 1 the simulated sine wave is made up of four square waves which are designated 216°, 252°, 288° and 324° respectively for a purpose which will become clear as the description proceeds and which form the stepped wave $\phi A$. The angle of the simulated sine wave is chosen as being half way between the angle of the square waves.

If the portions A1 and A2 are to be equal, the area $(A3+A4)$ must be equal to $(MA+MB)$ $(\pi/N)$ and equal to $$\int_{3\pi/2N}^{5\pi/2N} \sin U \, dU$$

where U is the angle along the sine wave. Likewise area $$A5 = (MA)(\pi/N) = \int_{\pi/2N}^{3\pi/2N} \sin U \, dU$$

Since the area A4 is equal to the area A5 and $$A3 = (MB)(\pi/N)$$

by substitution $$A3 = \int_{3\pi/2N}^{5\pi/2N} \sin U \, dU - \int_{\pi/2N}^{3\pi/2N} \sin U \, dU$$

and $$MB = N/\pi \int_{3\pi/2N}^{5\pi/2N} \sin U \, dU - \int_{\pi/2}^{3\pi/2N} \sin U \, dU$$

since $$MB = 2M_{324°}$$

$$M_{324} = N/2\pi \left[ \int_{3\pi/2N}^{5\pi/2N} \sin U \, dU - \int_{\pi/2N}^{3\pi/2N} \sin U \, dU \right]$$

If an output wave $\phi y$ has an angle $\theta \phi y$ from any base point is composed of a plurality of square waves which are less than plus or minus $\pi/2$ radians from the angle $\theta \phi y$ the magnitude $M_x$ of any one thereof having the angle $\theta M_x$ from the base point may be ascertained by means of a general formula which is apparent from the above formula developed for the magnitude $M_{324°}$. Since the angle U is the angle between the zero degree point on the sine wave of the output wave having the angle $\theta \phi y$ and angle $\theta$ of the general formula is the angle from any base point $U=\theta-\theta\phi y$. Substituting this in the equation for $M_{324°}$.

$$M_x = N/2\pi \left[ \int_{\theta M_x}^{\theta M_x + \pi/N} \sin(\theta - \theta\phi y) d\theta - \int_{\theta M_x - \pi/N}^{\theta M_x} \sin(\theta - \theta\phi y) d\theta \right]$$

By integrating the foregoing reduces to $$M_x = N/2\pi \left[ -\cos(\theta - \theta\phi y) \int_{\theta M_x}^{\theta M_x + \pi/N} + \cos(\theta - \theta\phi y) \int_{\theta M_x - \pi/N}^{\theta M_x} \right]$$

$$= N/2\pi [\cos(\theta M_x - \theta\phi y) - \cos(\theta M_x + \pi/N - \theta\phi y)$$
$$-\cos(\theta M_x - \pi/N - \theta\phi y) + \cos(\theta M_x - \theta\phi y)]$$
$$= N/2\pi [2\cos(\theta M_x - \theta\phi y) - \cos(\theta M_x - \theta\phi y + \pi/N) -$$
$$\cos(\theta M_x - \theta\phi y - \pi/N)]$$

The last two terms will be recognized as comprising the cosine of the sum and difference of the same two angles $(\theta M_x - \theta\phi y)$ and $\pi/N$ and by simplification $$M_x = N/2\pi [2\cos(\phi M_x - \phi\theta y) - \cos(\phi M_x - \phi\theta y) \cos \pi/N + \sin(\theta M_x - \theta\phi y) \sin \pi/N - \cos(\theta M_x - \theta\phi y) \cos \pi/N - \sin(\phi M_x - \phi\theta y)(\sin \pi/N)]$$
$$= N/\pi [\cos(\theta M_x - \theta\phi y)(1 - \cos \pi/N)]$$

Since we are interested in relative magnitudes only the constant $KN/\pi$ may be dropped.

Figure 2:
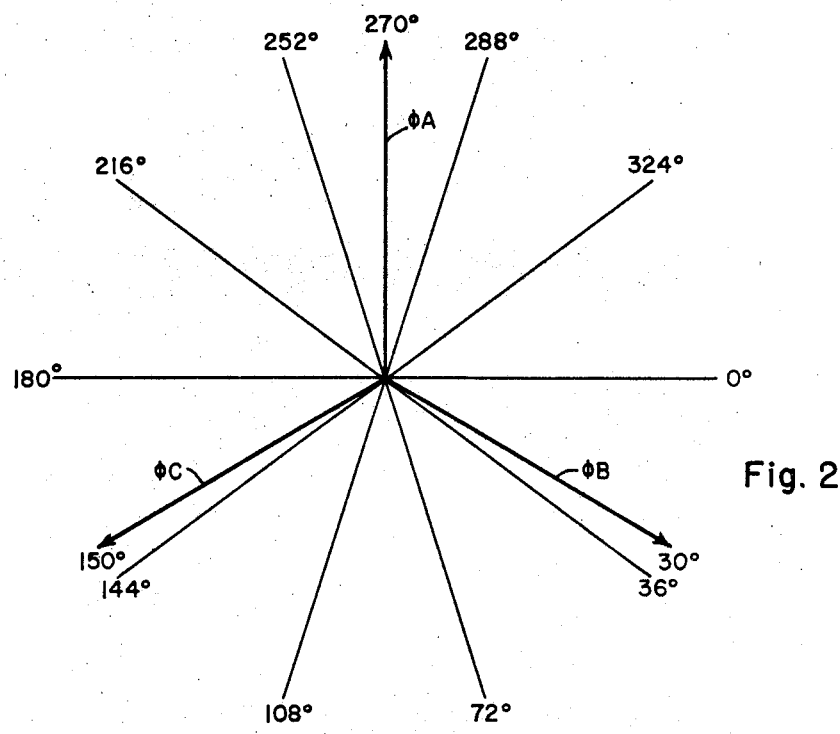
FIG. 2 is a diagram illustrating the phase relationship of the various output voltages of a five power stage inverter and their preferred relationship to a three phase output voltage.

The foregoing general formulae may be applied to determine the relative magnitudes of the individual square waves in the 5 power stage three phase arrangement illustrated in FIG. 2 in which the power stages are illustrated by vectors identified as 0°, 36°, 72°, 108°, 144°, 180°, 216°, 252°, 288° and 324° which designations also designate their relative angles. The illustrated vectors represent the fundamental of the respective voltage waves. The output line to neutral waves $\phi A$, $\phi B$, and $\phi C$ are located at 270°, 30° and 150°. It will be appreciated that the same power stage supplies the two sets of 180° displaced voltages 0° and 180°, 36° and 216°, etc.

The relative magnitudes of the square waves which are combined for $\phi A$ are as follows:

$$M_{216°} = \left(1 - \cos \frac{\pi}{5}\right) \cos \theta_{216°} - \theta_{270°})$$
$$= 0.19098 \cos(216° - 270°) = 0.11226$$

Figure 3:
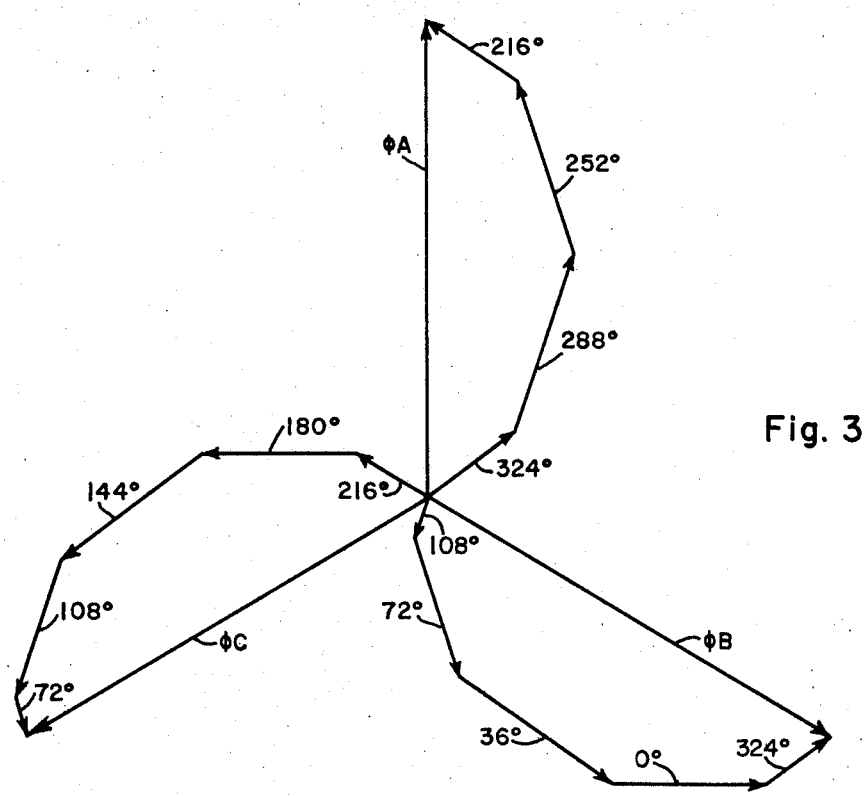
FIG. 3 is a vector diagram illustrating the magnitude and phase of the component voltages of a five power stage inverter which embodies the invention.
Figure 4:
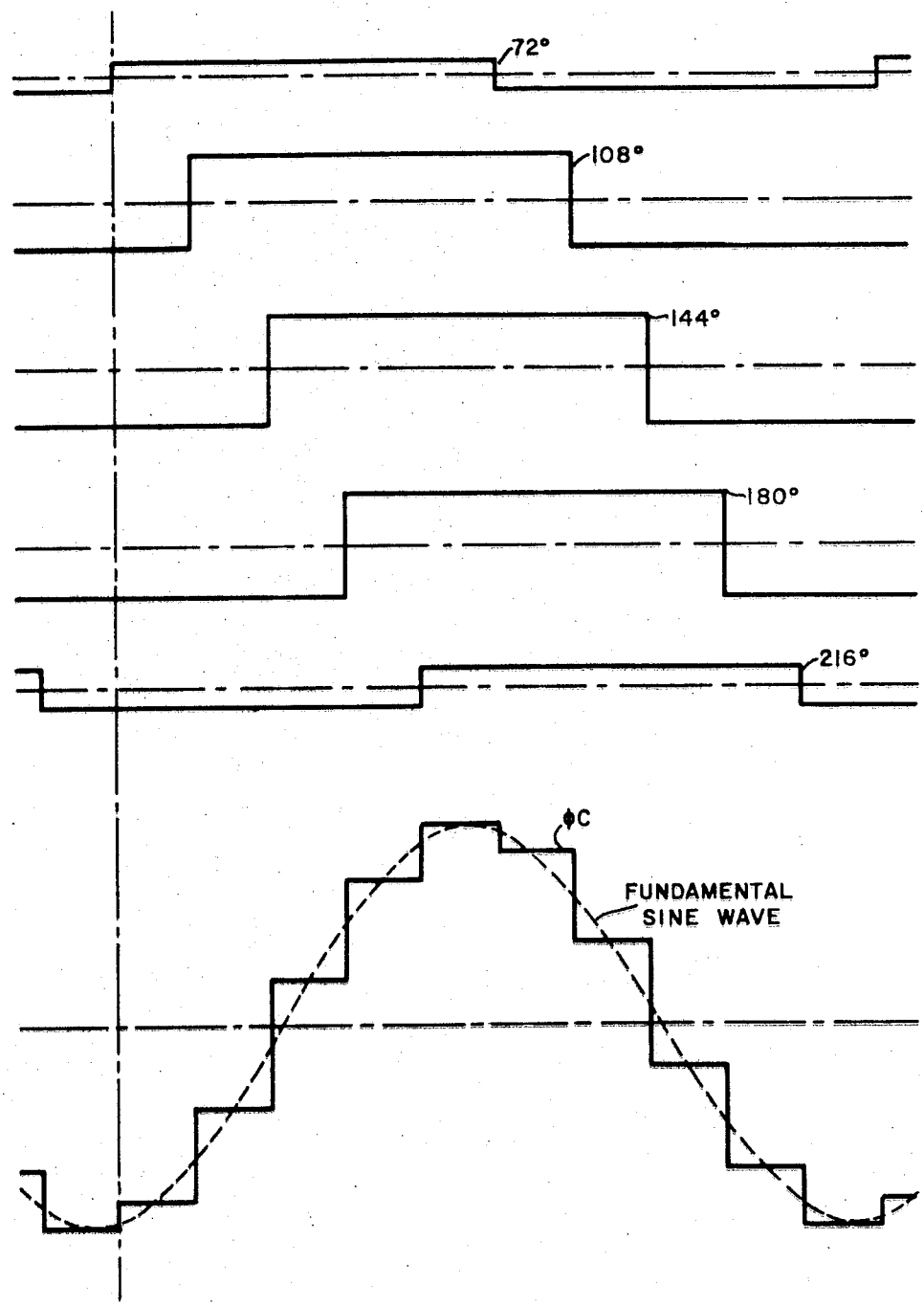
FIG. 4 is a view similar to FIG. 1 showing the component voltage wave of a six stage inverter and a modified four stage inverter.

$M_{252°} = 0.19098 \times \cos(252° - 270°) = 0.18164$
$M_{288°} = 0.19098 \times \cos(288° - 270°) = 0.18164$
$M_{324°} = 0.19098 \times \cos(324° - 270°) = 0.11226$
$M_{0°} = 0.19098 \times \cos(0° - 270°) = 0.00000$ The phase B relative magnitudes are as follows:

$M_{324°} = 0.19098 \times \cos(324° - 30°) = 0.07768$
$M_{0°} = 0.19098 \times \cos(0° - 30°) = 0.16540$
$M_{36°} = 0.19098 \times \cos(36° - 30°) = 0.18994$
$M_{72°} = 0.19098 \times \cos(72° - 30°) = 0.14193$
$M_{108°} = 0.19098 \times \cos(108° - 30°) = 0.03971$ The phase C relative magnitudes are as follows:

$M_{72°} = 0.19098 \times \cos(72° - 150°) = 0.03971$
$M_{108°} = 0.19098 \times \cos(108° - 150°) = 0.14193$
$M_{144°} = 0.19098 \times \cos(144° - 150°) = 0.18994$
$M_{180°} = 0.19098 \times \cos(180° - 150°) = 0.16540$
$M_{216°} = 0.19098 \times \cos(216° - 150°) = 0.07768$ FIG. 3 is a vector diagram of the various output voltages which combine together to make up the output voltages having the phases $\phi A$, $\phi B$ and $\phi C$ and is believed self-explanatory. FIGS. 1 and 4 show by means of voltage waves the instantaneous magnitudes and relative phases of the component voltages which comprise output phase $\phi A$ and $\phi C$.

It may be observed that $\phi A$ of FIGS. 1-3 is made up of one less component than $\phi B$ and $\phi C$. This is due to the symmetrical relationship of the $\phi A$ vector to the vectors 288°, 324° and 0° and to the vectors 252°, 216° and 180°.

If instead of five power stages are utilized each of the output phase vectors may be located symmetrically with respect to the vectors of its component power stages so that only five stages are used for each output phase. If the basic formulae are again applied, it will be ascertained that the lowest present harmonic is the eleventh and that the relative magnitudes of the component voltages which make up the phase voltages will be identical although phase displaced. The curves M, N, O, P, and Q show the relative phases and magnitudes of the component voltages which combine to provide the phase output voltage LA. The components of and phase output phase voltages LB and LC are identical except for absolute phase angles by which LA, LB and LC are relatively spaced 120 degrees and are set forth in FIG. 9.

The lowest harmonic $H_1$ of the fundamental which cannot be neutralized for any given number N power stages or drivers in which the component voltage magnitudes are as set forth above may be derived from the formula $H_1 = 2N - 1$. The next harmonic $H_2$ which is not neutralized may be derived from the formula $H_2 = 2N + 1$. Harmonics H of the lowest two harmonics $H_1$ and $H_2$ may also be present and therefore the general formulae for the number of power stages N and the order $n$ of the harmonic may be written $H = 2nN - 1$ and $H = 2nN + 1$. It will be appreciated that the greater the number of power stages N used, the higher the order of the lowest unneutralized harmonic.

Figure 6A:
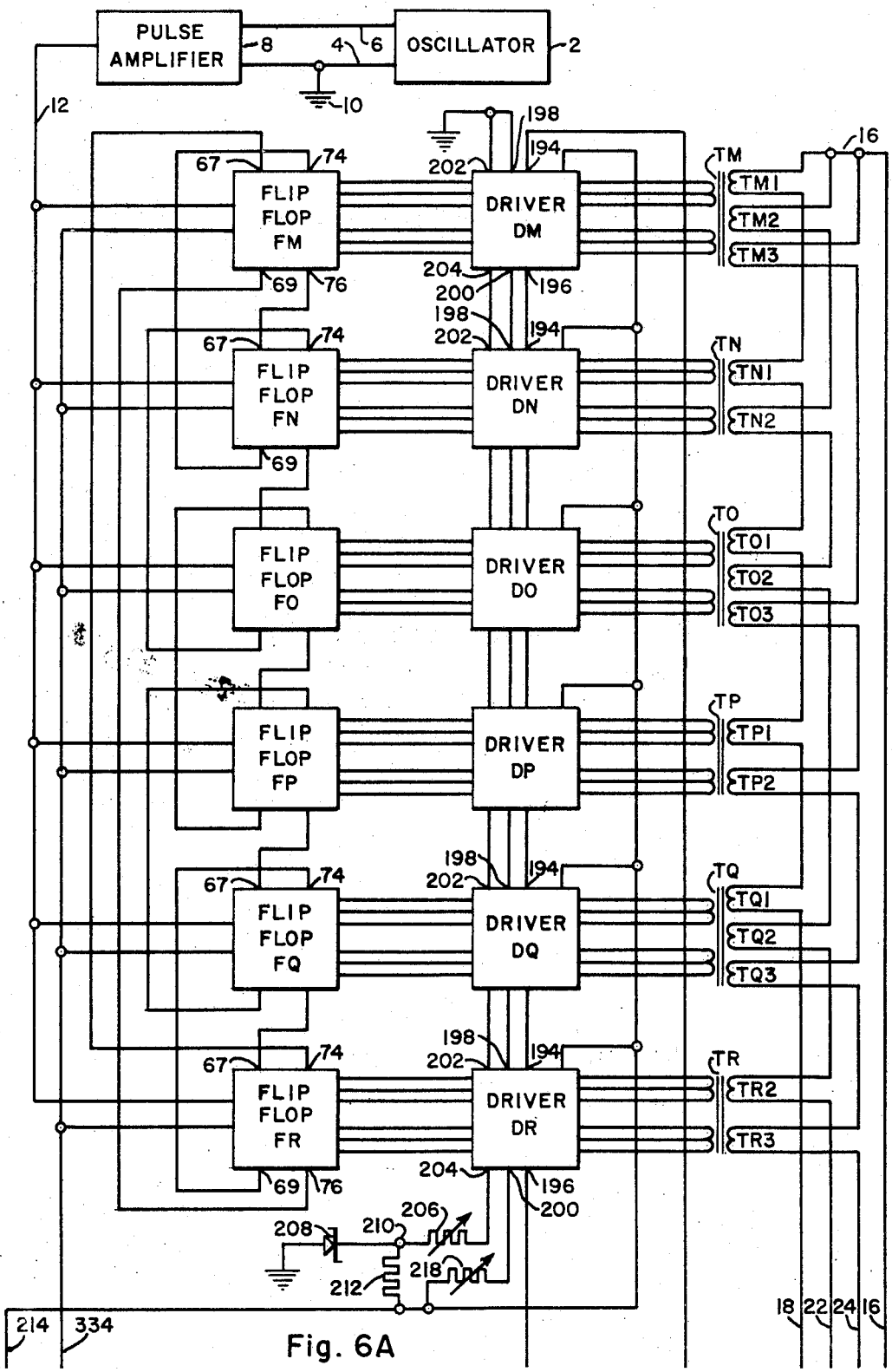
FIGS. 6A and 6B illustrate various portions of an inverter and, when placed end-to-end, illustrate a polyphase inverter embodying the invention.
Figure 6B:
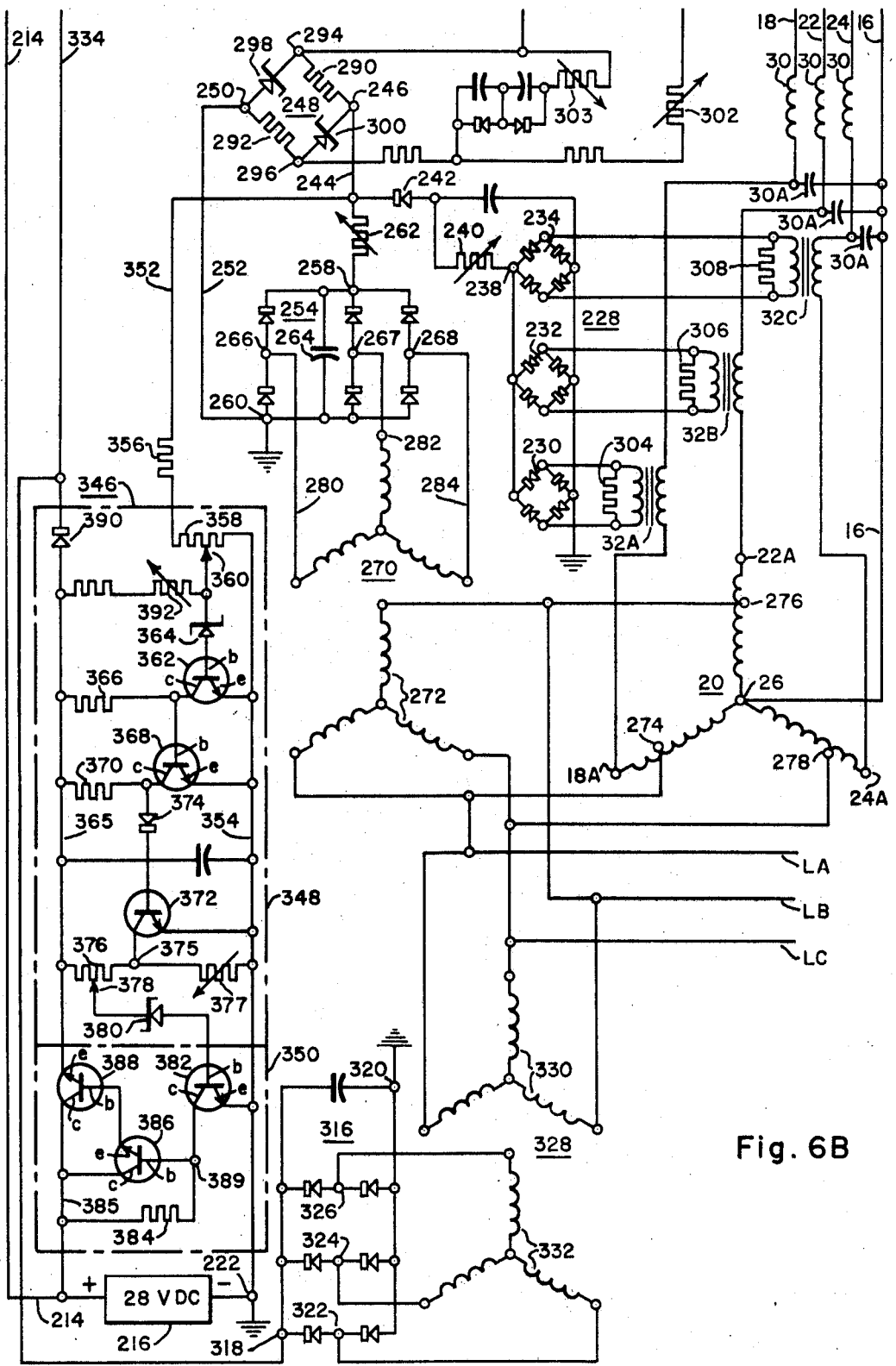

Referring to FIGS. 6A and 6B, the numeral 1 indicates generally a polyphase inverter network for energizing a plurality of three phase output conductors LA, LB, and LC. The voltages, which appear on each of the lines LA, LB and LC comprise the vector sum of the outputs of five of the six inverters M, N, O, P, Q, and R. These inverters are operated in sequence by means of pulses generated from an oscillator 2 which may be of any desired construction having a stable frequency. Since the oscillator per se forms no part of the invention, the details thereof are not further illustrated.

The output voltage wave of the oscillator 2 is applied between a grounded output wire 4 and an ungrounded output wire 6. These wires 4 and 6 are connected to input terminals of a pulse amplifier 8 and cause the amplifier 8 to supply operating pulses at a constant desired frequency between ground connection 10 and an ungrounded output bus 12 which is connected to an input terminal of each of the flip flop networks FM, FN, FO, FP, FQ, and FR. The pulse amplifier 8 may be of any desired construction which will provide an output voltage pulse which lowers the potential of the bus 12 with respect to the ground connection 10. Preferably, the output wave has a steep front.

While all of the flip flop networks FM, FN, FO, FP, FQ, and FR receive a pulse for each operation of the pulse amplifier 8, only one thereof is operated as a consequence of any one pulse. As will be described below, a first successive set of six output pulses will successively actuate the flip flops FM, FN, FO, FP, FQ, and FR into a first operating condition in which all will provide an output signal of a first polarity to the drivers DM, DN, DO, DP, DQ, and DR, respectively. Thereafter, a second successive set of six output pulses will successively operate the flip flops to a second operating condition in which all will provide an output signal of second polarity opposite to said first polarity. The successive sets of six pulses occur in continuing succession (with the time interval between successive sets being the same as the time interval between the pulses of each set) to continually actuate the drivers DM–DR. It will be appreciated that when operated in this manner, the flip flop networks will be sequenced at 30° intervals with respect to the output voltage wave appearing between the output conductors LA, LB and LC.

The drivers DM, DN, DO, DP, DQ, and DR are essentially relaying devices for energizing the voltage supplying transformers TM, TN, TO, TP, TQ, and TR in sequence. The transformers TN, TP, and TR are provided with two output windings T1 and T2, T1 and T3, and T2 and T3, respectively, while the output transformers TM, TO, and TQ are each provided with three output windings T1, T2, and T3. The T1 windings are connected in series between a common output bus 16, which may be grounded if desired and an output bus 18 connected to one terminal 18A of a three phase output transformer 20. Likewise, the windings T2 are series connected between the common bus 16 and an output bus 22 connected to a terminal 22A of the transformer 20. Similarly, the winding T3 is series connected between the common bus 16 and an output bus 24 connected to another terminal 24A of the transformer 20. The transformer 20 is connected in wye or star and the common output bus 16 is connected to the neutral terminal 26 thereof.

Filter reactors 30 and current transformers 32A, 32B, and 32C are individually inserted in series in the conductors 18, 22 and 24 leading to the terminals 18A, 22A and 24A. Filter capacitors 30A are connected in shunt at the junctions of the filter reactors 30 and the current transformers 32A, 32B and 32C to the common bus 16. The relative voltages of the various output windings of the voltage supplying transformers TM, TN, TO, TP, TQ and TR are set forth in FIG. 9. It can be proven mathematically that when the voltages are so related in phase and magnitude and combined no harmonics will be present in the combination below the 11th harmonic of the fundamental and this 11th harmonic will be small as compared to the fundamental. It will be appreciated that the third, fifth, and seventh harmonics as well as all multiples of the second and third harmonics will be eliminated so that a highly usable wave shape is generated without the use of bulky, costly, and weighty wave-shaping networks.

In order to control the output voltages at the conductors LA, LB and LC, the drivers DM, DN, DO, DP, DQ and DR are controlled to regulate the length of time that electrical energy is supplied to the primary windings of the voltage supplying transformers TM, TN, TO, TP, TQ and TR. The pulse length is made shorter or longer to decrease or increase output voltage at the conductors LA, LB and LC. The maximum output voltage is attained with a pulse length of 180°. It can be proven mathematically that variation in pulse width does not reconstitute any harmonic below the 11th harmonic provided the pulse length is maintained equal in each power stage.

Figure 7:
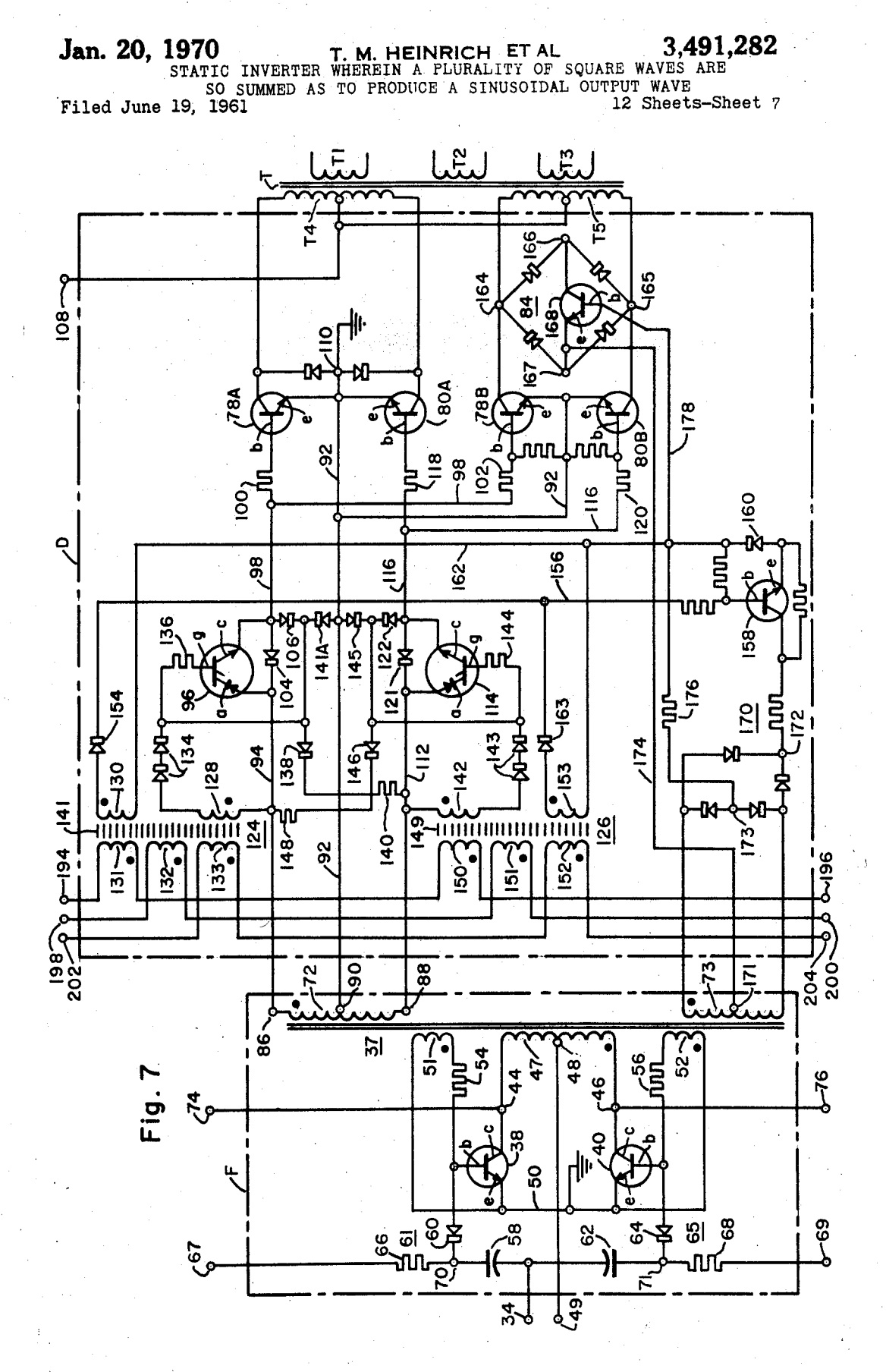

Each of the flip flops FM, FN, FO, FP, FQ and FR are of identical construction and each of the drivers DM, DN, DO, DP, DQ and DR are of identical construction. A single schematic for the flip flops and a single schematic for the drivers is illustrated in the interest of simplifying the disclosure, the details of which are shown in FIG. 7.

In the schematic illustration of the flip flop circuits FM, FN, FO, FP, FQ and FR, the flip flop is identified by the letter F. Similarly, driver schematic is identified by the letter D and the illustrated transformer which represents the voltage supplying transformers TM, TN, TO, TP, TQ and TR is labeled T. Since certain of the voltage supplying transformers have two windings while others have three windings, the transformer T of FIG. 7 will be illustrated as having windings, T1, T2 and T3. When transformer T becomes transformers TN, TP, or TR, the windings T3, T2, or T1 may be omitted to agree with the circuit showing in FIG. 6A.

The flip flop F is provided with a signal input terminal 34 to which the signal supplying bus 12 is connected and by which the inverter network F is actuated to change the polarity of energization of its associated transformer 37. The polarity of energization is determined by which of a pair of transistors 38 and 40 is made to conduct. More particularly, the end terminals 44 and 46 of a primary winding 47 of the transformer 37 are connected respectively to the collectors $c$ of the transistors 38 and 40 while the center tap terminal 48 is connected to a terminal 49, which is connected to a positive terminal of a source of direct potential as will be described below. The emitters $e$ of the transistors 38 and 40 are each connected to a grounded bus 50 which connects with the other side of the DC supply to which terminal 49 is connected. Conduction of the transistors 38 and 40 is controlled by tertiary windings 51 and 52 of the transformer 37. The windings 51 and 52 are connected through current limiting resistors 54 and 56 between the bases $b$ and the emitters $e$ of the transistors 38 and 40, respectively. The polarity of these connections is such that the feedback voltage tends to hold the conducting transistor 38 or 40 conducting and the nonconducting transistor 40 or 38 nonconducting.

The input signal termial 34 is connected through a capacitor 58 and a rectifier 60 of a first "and" network 61 to the base $b$ of the transistor 38 and through a capacitor 62 and rectifier 64 of a second "and" network 65 to the base $b$ of the transistor 40. The "and" network 61 also includes a resistor 66 which connects the common terminal 70 of the capacitor 58 and rectifier 60 to a control terminal 67. Similarly, the network 65 includes a resistor 68 which connects the common terminal 71 of the capacitor 62 and rectifier 64 to a control terminal 69.

In order to reverse the conducting conditions of the transistors 38 and 40, a negative pulse is applied to the terminal 34. This negative pulse instantaneously lowers the potential of one terminal of each of the capacitors 58 and 62 of the "and" networks 61 and 65. This results in a momentary drop in potential of the terminals 70 and 71. If the potential applied to the terminals 67 and/or 69 is sufficiently positive, the potential of terminals 70 and/or 71 will not be lowered all the way to ground potential, the ground bus 50 and the "and" circuit 61 and/or 65 will not pass the negative pulse to effect a change in the operating condition of either of the transistors 38 or 40. If, however, one of the terminals 67 or 69 as for example terminal 67 is of lesser potential, the momentary drop in potential at terminal 34 will result in a lowering of the potential of the base electrode $b$ of the transistor 38 below ground potential. This potential is below that of its emitter electrode $e$ and transistor 38 will cease conducting if it had previously been conducting. It it was previously nonconducting, it will, of course, remain nonconducting.

Assume that transistor 38 is conducting, transistor 40 is nonconducting and the potential of terminal 67 is at a reduced potential. When the negative pulse is supplied to terminal 34, the potential of the terminal 70 and base $b$ of transistor 38 will be momentarily lowered below the potential of the emitter $e$ and current will flow through the rectifier 60 to charge the capacitor 58 thereby momentarily reducing or removing the base drive from the conducting transistor 38. This reduction or removal of the base drive of transistor 38, results in a reduction of its conductivity and a reduction in current flow through the primary winding 47. This reduction in current in winding 47 causes a reduction of the rate of increase in flux in the core of the transformer 37 whereby the potential induced in the windings 51 and 52 is reduced thereby further reducing the base drive and the current. Shortly the transistor 38 will become nonconducting and the flux in the core of transformer 37 will start to collapse. When this occurs, the output potentials of the windings 51 and 52 will reverse causing transistor 40 to conduct and transistor 38 to be driven further into its nonconducting state. The current through transistor 40 causes flux to increase in the opposite direction to energize the windings 51 and 52. The regenerative feedback voltage from winding 52 shortly drives transistor 40 into its saturated condition and a complete reversal of the polarity of the output potential of the secondary windings 72 and 73.

The "and" networks 61 and 65 are controlled to block or pass the negative signals applied to the input terminal 34 by means of potentials applied to their input connections 67 and 69. These potentials are derived from a pair of output terminals 74 and 76 of the preceding one of the flip flops FM–FR and are arranged to provide a sequence of potential change such that only one of the flip flop networks FM, FN, FO, FP, FQ, and FR may be actuated by any one negative impulse supplied concurrently to all of the input terminals 34. The terminals 74 and 76 are respectively connected to the end terminals 44 and 46 of the winding 47. Each terminal 74 and 76 will have a potential which is either substantially that of the ground bus 50 or a potential which is substantially positive with respect to ground potential depending upon which of the transistors 38 or 40 is conducting.

The interconnection of the flip flops FM–FR is shown in FIG. 6A. Since it is desired to operate the flip flops in the order FM, FN, FO, FP, FQ, FR, FM, FN, FO, FP, FQ, etc., the terminals 67 and 69 of the flip flop FN are energized from the terminals 76 and 74 of the flip flop FM. Likewise, the terminals 67 and 69 of FO–FR are operated by the terminals 76 and 74 of the networks FN–FQ respectively. With this arrangement the flip flop networks FM–FR will be placed sequentially in the same operating condition by a sequence of negative pulses. The interconnection between the flip flop network FR and FM is reversedly arranged with the terminals 74 and 76, the network FR connected respectively to the terminals 67 and 69 of the network FM. This is because the network FM is to be placed in an operating condition opposite to that of the network FR on the next pulse subsequent to the pulse which actuated the network FR.

The winding 72 of transformer 37 provides the control signal for controlling the conductive conditions of the transistors 78A, 78B, 80A, and 80B, which in turn control the energization of the associated voltage supplying transformer TN–TR. The winding 73 of transformer 37 provides a control signal for turning on a shorting network 84. Each driver DM–DR includes such a network which when conductive reduces the impedance to current flow through the secondary windings T1, T2, and T3 of the associated one of the transformers TM–TR. If full output voltage is desired at all times, the winding 73 and shorting network 84 could be dispensed with because under these conditions current is not required to flow through any of the secondary windings with the transistors 78A, 78B, 80A, and 80B nonconductive.

Referring more specifically to the specific construction of the drivers, winding 72 is provided with end terminals 86 and 88 and a center terminal 90. The center terminal 90 is connected by means to a bus 92 to the emitters e of the transistors 78A, 78B, 80A and 80B. The terminal 86 is connected by a conductor 94, a controlled rectifier 96, and conductor 98 to the base b of the transistors 78A and 78B. Current-sharing resistors 100 and 102 are respectively connected between the conductor 98 and the bases b of the transistors 78A and 78B. The anode a of the controlled rectifier 96 is connected to the conductor 94 while the cathode c thereof is connected to the conductor 98. A rectifier 104 is reversedly connected across the anode and cathode to provide a low impedance reverse biasing current through the transistors 78A and 78B during the half cycle in which the terminal 90 is positive with respect to terminal 86. The forward drop of the rectifier 106 provides a reverse biasing of the controlled rectifier 96 during the portion of the half cycle in which terminal 86 is positive with respect to terminal 90 and prior to the saturation of the transformer 124. The controlled rectifier 96 is a valve device which prevents substantial flow of current therethrough until a suitable signal is applied to its gate g. When such signal is received, the impedance of the device becomes very low and the device conducts irrespective of the signal applied to the gate. Thereafter the impedance continues to remain low and the device continues to conduct.

Prior to the conduction of the controlled rectifier 96, the forward drop of rectifier 106 is opposed by the greater forward drop of rectifier 141A (which may comprise two rectifiers connected in series) to force a net back-bias potential on bases b of transistors 78A and 78B. When the controlled rectifier 96 conducts drive current flows from the terminal 86 through an obvious path to the bases b of the transistors 78A and 78B. This drive current then flows through the emitters e of these transistors and bus 92 to the terminal 90. When this occurs, the transistors 78A and 78B conduct and current flows from the positive supply terminal 108 through the upper halves of the primary windings T4 and T5 of the transformer T, the transistors 78A and 78B to ground terminal 110 through ground connections to the grounded negative source terminal.

Figure 5:
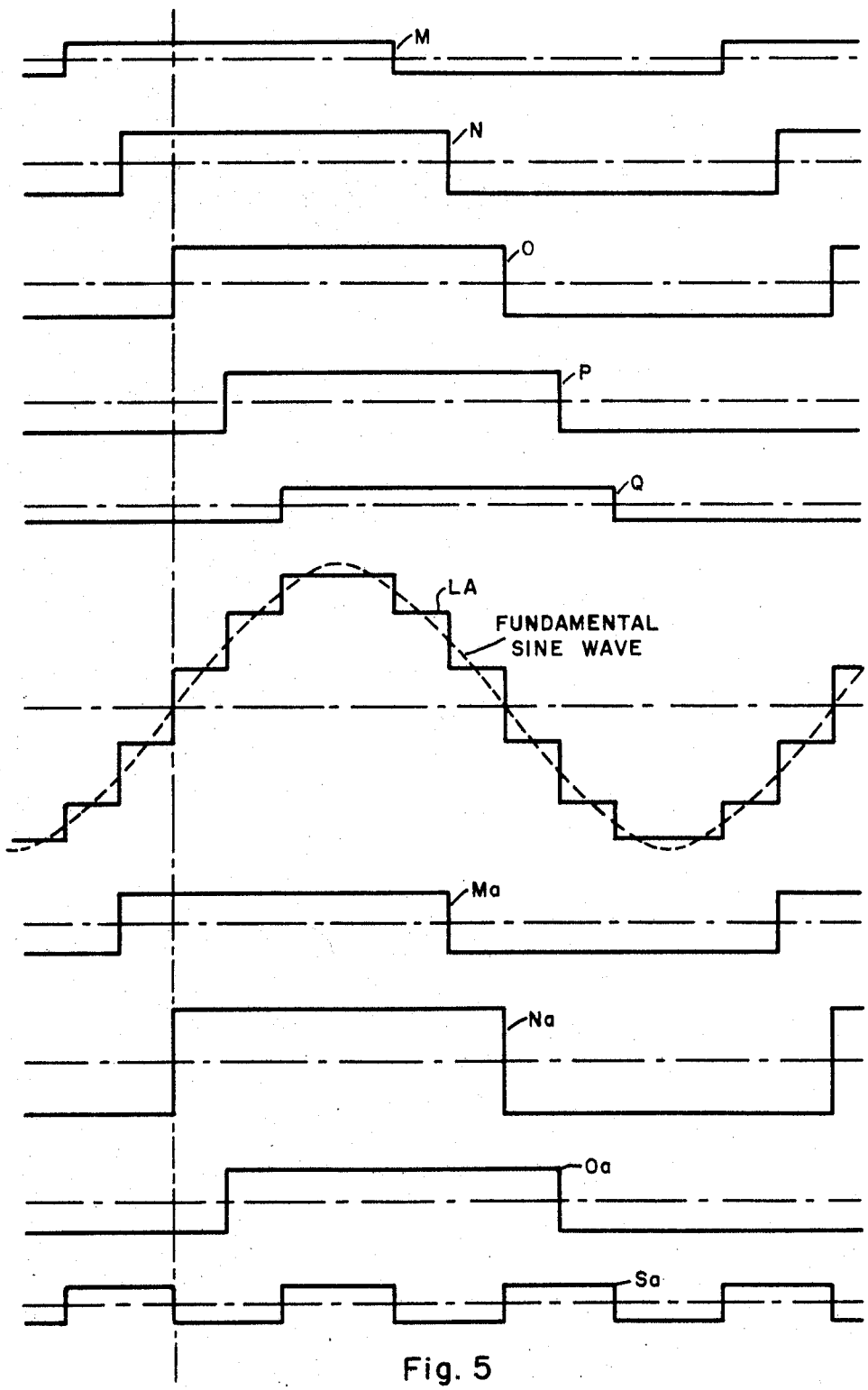
FIG. 5 is a view similar to FIG. 1 illustrating the composite make up of the output voltage wave of a six stage inverter and a modified four stage inverter.

The winding terminal 88 is similarly connected through a conductor 112, a controlled rectifier 114 (which is preferably the same type as rectifier 96), a conductor 116 to the bases b of the transistors 80A and 80B. Current-sharing resistors 118 and 120 are connected between the conductor 116 and the bases b of the transistors 80A and 80B, respectively. Transistors 80A and 80B are rendered conducting as a consequence of the conduction of the controlled rectifier 114 to energize the lower halves of the windings T4 and T5. When the transistors 78A and 78B conduct, the output conductors 98–92 serve as a square valve voltage source of one polarity. Likewise, when the transistors 80A and 80B conduct, the output conductors 116–92 serve as a square wave voltage source of the opposite polarity. As set forth above and graphically illustrated in FIG. 5, the square wave sources (transistors 78A and 78B) of each of the drivers DM–DR are sequentially actuated at intervals equal to $\pi/N$ radians and thereafter the other square wave sources (transistors 80A and 80B) of each of the drivers DM–DR are sequentially actuated at intervals of $\pi/N$ radians.

Conduction of the controlled rectifiers 96 and 114 is controlled by means of saturable transformers or magnetic amplifiers 124 and 126 respectively. For this purpose, the transformer 124 is provided with a primary or gate winding 128 and control windings 131, 132, and 133. One terminal of the winding 128 is connected to the bus or conductor 94 and the other terminal is connected through one or more rectifiers 134 and a current limiting resistor 136 to the gate g of the controlled rectifier 96.

The cathode c is connected through the rectifier 106, a rectifier 138, a resistor 140, and the conductor or bus 112 to the winding terminal 88. Prior to saturation of the core 141 only magnetizing current flow through the winding 128 which supports substantially the entire potential appearing between the terminals 86 and 90 so that the common junction of the rectifiers 106, 138, and 134 will remain at or below the potential of the bus 98 by the forward drop of the rectifier 106 and the rectifier 96 will not become conductive. When, however, the core 141 saturates, the impedance of the winding 128 decreases and the potential of the common point of rectifiers 134 and resistor 136 approaches that of the bus 94 and current sufficient to render the controlled rectifier 96 conductive will flow. Upon conduction of the rectifier 96 drive current, for the transistors 78A and 78B, will flow from the terminal 86 through the bus 94, the controlled rectifier 96, conductor 98, resistors 100 and 102, bases *b* of the transistors 78A and 78B, emitters *e* of these same transistors, and bus or conductor 92 to the terminal 90 causing the transistors 78A and 78B to conduct. Current then flows through the upper halves of the primary windings T4 and T5. If desired, separate sources for each of the drivers DM–DR as well as for the windings T4 and T5 may be provided instead of the single source as shown.

The controlled rectifier 114 is similarly controlled by the transformer 126 which has one terminal of its primary winding 142 connected to gate *g* thereof through one or more rectifiers 143 and a current limiting resistor 144. The cathode *c* of rectifier 114 is connected to terminal 86 through rectifiers 122 and 146, a resistor 148 and the bus 94. Subsequent to a desired time interval after energization of the winding 72 in a direction in which terminal 88 is positive with respect to terminal 86, the core 149 will saturate and the controlled rectifier 114 will conduct to render the transistors 80A and 80B conductive. Prior to conduction of rectifier 114 the forward drop across the rectifier 145 (which like rectifier 141A may comprise a plural number of units) will be greater than the forward drop across rectifier 122 and transistors 80A and 80B will be held non-conductive. Since in the absence of conduction of the controlled rectifiers, the transistors 78A, 78B, 80A, 80B will not conduct, it will be apparent that only 78A and 78B or 80A and 80B can conduct at any given time.

The time interval required to saturate the cores 141 and 149 may be altered by controlling the initial or residual flux. This initial flux in the case of core 141 is determined by the magnitude of the unidirectional current flowing through each of the windings 131, 132, 133 and in the case of the core 149 by the current flowing through windings 150, 151 and 152 through circuits which will be discussed below.

In order to actuate the shorting network 84 during intervals between the conduction of the transistors 80A and 80B and the initiation of conduction of the transistors 78A and 78B, the transformer 124 is provided with a secondary winding 130 which will obviously be energized during the interval preceding saturation of the core 141.

One terminal of the winding 130 is connected through a rectifier 154 and conductor 156 to the base *b* of a transistor 158. The emitter *e* of this transistor 158 is connected through a rectifier 160 and conductor 162 to the other terminal of the winding 130. The polarity of the voltage induced in the winding 130 is such that the potential induced therein prior to saturation of the core 141 is in a direction to maintain the transistor 158 conducting.

The transformer 126 is also provided with a winding 153 which is connected between the conductors 156 and 162 through a rectifier 163 so that during the buildup of flux in the core 149 the winding will cause the transistor 158 to be conductive. Subsequent to saturation of the core 141 or 149 the windings 130 and 153 have no voltage induced therein so that transistor 158 is rendered conductive only during the buildup of flux in each of the transformers 124 and 126 and is promptly thereafter rendered nonconductive.

The transistor 158 controls the conduction of the winding shorting network 84 and acts to render it conductive during the delay interval between the conduction of transistors 78A and 78B and the conduction of transistors 80A and 80B or vice versa. The network 84 is provided with input terminals 164 and 165 and intermediate terminals 166 and 167. Four rectifiers are individually connected between the terminals to provide current paths from the terminal 167 to the terminals 164 and 165 and from the terminals 164 and 165 to the terminal 166. A control transistor 168 is connected between the terminals 166 and 167 in a polarity to conduct current from terminal 166 to terminal 167.

Drive current for controlling the conductivity of transistor 168 is derived from the winding 73. Winding 73 is connected through a full wave rectifying network 170 to positive potential output terminals 172 and a negative potential terminal 173. The center terminal 171 of the winding 73 is connected by means of conductor 174 to the emitter *e* of the transistor 168. The negative terminal 173 is connected through a current limiting resistor 176, conductor 178 and rectifier to 160 to the emitter *e* of transistor 158. The emitter *e* of transistor 158 is also connected through rectifier 160 and conductor 178 to the base *b* of the transistor 168. Therefore, conduction of the transistor 158 renders the transistor 168 conducting to maintain the shorting network 84 effective to short the winding T5 during the time periods that no power is being delivered to the transformer T with which it is associated and to open the network 84 when power is being delivered thereto.

The time of saturation of the transformers 124 and 126 is controlled by the magnitude of the unidirectional current flowing in the windings 131, 132, 133, 150, 151, and 152 which are energized, as will be pointed out, from a constant-current reference source, a source which is proportional to the potential supplied to the terminals 108 and 110, and a source which is a function of the magnitude of the overload output voltage or current. The windings 131 and 150 are connected in series between the control terminals 194 and 196, the windings 132 and 151 are connected in series between the control terminals 198 and 200, and the windings 133 and 152 are similarly connected in series between the control terminals 202 and 204.

As will be apparent from FIGS. 6A and 6B, the control circuits of the various drivers DM–DR are connected in series by connecting the terminals 194, 198 and 202 of the drivers DN, DO, DP, DQ and DR, respectively, to the terminals 196, 200 and 204 of the drivers DM, DN, DO, DP and DQ. The circuit including the windings 133 and 152 of the various drivers DM are provided with an adjustable but constant current therethrough and for this purpose the terminal 202 of the driver DM is connected to ground and the terminal 204 of the driver DR is connected thhrough a variable resistor 206 and a Zener diode 208 to ground. The common point 210 between the Zener diode 208 and the variable resistor 206 is connected thhrough another resistor 212 to a bus 214 which is maintained at a positive potential with respect to ground by a suitable source of direct current potential 216. A potential of 28 volts is desirable. With this arrangement the potential of the common point 210 is maintained at a substantially constant potential with respect to ground and a constant current of a magnitude determined by the adjustment of the variable resistor 206, will flow through the coils or windings 133 and 152 of all of the drivers DM–DR.

The windings 132 and 151 provide compensation for compensating for any changes in output voltage of the direct current source 216. The terminal 198 of the driver DM is grounded while the terminal 200 of the driver DR is connected through a variable resistor 218 to the direct current potential bus 214. With this arrangement, a current proportional to the voltage of the source 216 flows through the various transformers 124 and 126 of the drivers DM–DR which tends to compensate for any potential variations of the source 126.

The windings 131 and 150 provide for reducing the output potential of the transformers TM–TR if the output current and/or voltage of the polyphase inverter 1 exceeds predetermined magnitudes. The signal for controlling the windings 131 and 150 is derived from an output current and/or output voltage signal. The current signal is derived from the current transformers through a rectifier network 228 which has an output voltage proportional to the larger of the currents in the lines LA, LB and LC.

The network 228 comprises a plurality of bridge type rectifiers 230, 232 and 234 which are energized by the current transformers 32A, 32B and 32C. The direct current output terminals of these rectifiers are connected in parallel between a grounded bus 236 and an ungrounded bus 238. The bus 238 is connected through a variable resistor 240 and a rectifier 242 and a bus 244 to one input terminal 246 of an error signal bridge 248. The other input terminal 250 of the bridge 248 is connected to a ground bus 252.

The voltage signal (for the windings 131 and 150) is derived from a full wave rectifier bridge 254, of usual construction, having a positive potential output terminal 258 and a grounded negative potential output terminal 260. The positive potential terminal 258 is connected through a variable resistor 262 to the bus 244. A filter capacitor 264 is connected between the output terminals 258 and 260. A three phase wye connected transformer array 270 has its primary windings 272 connected to terminals 274, 276 and 278 of the output transformer 20 and its secondary windings connected in wye and to the input terminals 266, 267 and 268 of the rectifier network 254 by means of conductors 280, 282 and 284. With this arrangement, the bridge 248 will be energized with the higher one of the output voltages representing the output current and output voltage of the inverter 1.

The error signal bridge 248 comprises a pair of resistors 290 and 292 which are respectively connected between input terminal 246 and an output terminal 294 and input terminal 250 and an output terminal 296. Zener diodes 298 and 300 are respectively connected between the terminals 294 and 250 and terminals 296 and 246.

The control voltage applied between the terminals 246 and 250 by the rectifiers 254 at the normal value of output voltage of the lines LA, LB and LC is twice the breakover value of the Zener diodes 298 and 300. Under these conditions the voltage drop across each of the resistors 290 and 292 is the same as the voltage drop across each of the Zener diodes 298 and 300 and there is no potential difference between the bridge terminals 294 and 296. An increase or decrease in the output potential of the rectifier 254 resulting from an increase or decrease in line potential will unbalance the bridge 248. An increase in line potential unbalances the bridge to provide a current flow through the windings 131 and 150 in a direction to increase the saturating time of the transformers 124 and 126 and of a magnitude dependent upon the magnitude of the unbalance. This increased saturating time will decrease the length of pulse supplied by each of the drivers DM–DR and reduce the line voltage. The reverse effect would occur as a consequence of a decrease in line potential to reduce the saturating time of the transformers 124 and 126. Overcurrent protection is provided by a voltage signal applied to the bridge 248 from the rectifier network 228 and may be arranged to limit the line current so that even if the lines LA, LB and LC are shorted the current will not exceed a predetermined desired magnitude which might cause destruction of the apparatus prior to opening of the normal circuit breakers (not shown).

Settings of adjustable resistors 302 and 303 are determined by stability considerations. Setting of adjustable resistor 240 establihes the rate of decreae or collapse of output voltage with increase of overcurrent. Resistors 304, 306 and 308 provide such burden on current transformers 32A, 32B and 32C to determine the critical value of overcurrent at which the overcurrent protection circuit begins operating.

The power for operating the flip-flop networks FM–FR under output load current values below a predetermined value is derived from a rectifier network 316 having positive and negative output terminals 318 and 320 and AC input terminals 322, 324, and 326. The network 316 is energized from a transformer 328 having its primary windings 330 connected to the output lines LA, LB, and LC and its secondary windings 332 connected to input terminals 322, 324, and 326. The negative output terminal 320 is connected to ground and therethrough to the grounded buses 50 of the networks FM–FR while the positive output terminal 318 is connected through positive potential power supply bus 334 to the input terminals 49 of each of the flip flop networks FM–FR.

This arrangement provides a low-loss regulated source of potential for energizing the flip flop networks. This voltage may, for example be maintained at 15 volts and which is adequate to enable the flip flops FM–FR to drive and the control drivers DM–DR with high efficiency at load current values below a predetermined value. At operating conditions of the inverter 1 at greater load current values it may be desirable to operate the transistors 38 and 40 at higher current values to supply an increased drive voltage to the drivers DM–DR. This increased voltage is provided by a network 346 energized directly from the 28 volt DC source 216.

This network 346 comprises a signal amplifier 348 and a voltage regulator 350. The amplifier 348 is actuated by the output current signal established by the rectifier network 228. The current signal is transmitted thereto through a conductor 352 which connects the common bus 244 to a grounded bus 354 of the network 346 through a pair of series connected resistors 356 and 358. The resistor 358 may take the form of a conventional potentiometer and is provided with an arm 360 or other intermediate tap the potential of which, with respect to that of the ground bus 354, will be a function of the magnitude of the potential of the conductor 352 which is proportional to the overcurrent in the one of the lines LA, LB, and LC transmitting the greatest current.

This potential difference between the arm 360 and the grounded bus 354 is applied between the base and emitter of a first transistor 362 of the amplifier 348 through a Zener diode 364. When this potential reaches the breakover potential of the diode 364 (which is the predetermined current magnitude above full-load current in the lines LA, LB, or LC which requires an increased drive to be applied to the drivers DM–DR), the diode 364 conducts to render the transistor 362 conductive. The main or emitter-collector circuit of transistor 362 is connected between an output potential bus 365 and ground bus 354 through a biasing resistor 366. When transistor 362 conducts, the drop across resistor 366 lowers the potential of the base electrode *b* of amplifying transistor 368 (which is connected intermediate the collector *c* of transistor 362 and resistor 366) from substantially the potential of the bus 365 to substantially the potenial of the bus 354. The emitter of transistor 368 is directly connected to the bus 354 and this reduction in drive signal causes the previously conducting transistor 368 to cease conducting. The collector *c* of this transistor 368 is connected through a resistor 370 to bus 365 so that the potential of the collector *c* of the transistor 368 which was previously substantially at ground potential now increases to substantially that of the bus 365.

Another amplifying transistor 372 has its base connected through a rectifier 374 to the common point between the collector *c* of transistor 368 and resistor 370, its emitter *e* connected to bus 354, and its collector *c* connected to a terminal 375 common to a pair of series connected resistors 376 and 377. The free end of the resistor 376 is connected to bus 365 while the free end of the variable resistor 377 is connected to the grounded bus 354. Rendering of the transistor 368 into its nonconducting condition causes the normally nonconductive transistor 372 to conduct. When conductive, the transistor 372 shunts the resistor 377 whereby substantially the entire potential between the buses 354 and 365 appears across the resistor 376.

When this occurs the ratio between the potential of the slider 378 and the potential between the buses 354 and 365 is changed so that the potential difference between that of the slider 378 and the bus 354 is reduced. Since the Zener diode 380 attempts to maintain a constant voltage drop thereacross the current flow therethrough will decrease in and endeavor to reestablish the initial potential difference which was being maintained between the slider 378 and bus 354. This reduction in the current flow through the Zener diode 380 which is connected between the slider 378 and the bus 354 through the base b and emitter e of a modulating transistor 382 of the voltage regulator 350 reduces the flow of current therethrough and a bias resistor 384 connected in series between the positive potential bus 385 energized from the positive terminal of source 216 and the collector c of the transistor 382.

With the transistor 372 nonconducting, the resistor 377 is adjusted to provide for a predetermined current flow through the Zener diode 380. This predetermined current maintains the transistor 382 in a first conductive condition to maintain second and third transistor 386 and 388 of the regulator 250 in a first conducting state. When so controlled the transistors 386 and 388 will maintain a potential difference between the buses 354 and 365 less than the potential established between the terminals 318 and 320 of the network 316.

More specifically, the base b of the transistor 386 is connected to the common point 389 between the collector c of transistor 382 and the resistor 384, its collector c is connected to bus 385, and its emitter e is connected to the base b of the transistor 388. The collector c of transistor 388 is connected to bus 385 while the emitter e thereof is connected to bus 365. With the transistor 372 nonconducting, a greater current flow through the Zener diode 380 is required to maintain a predetermined potential difference between the slider 378 and bus 354 than when the transistor 372 is conducting and the resistor 377 is effectively shorted. This lesser current flow through diode 380 reduces the conductivity of the transistor 382 and the current through resistor 384. This current reduction through resistor 384 raises the potential of the base of the transistor 386 to increase its base drive current. This increases in base drive current increases the conductivity of the transistor 386 which increases the base drive current for transistor 388 to increase its conductivity and to provide a greater current flow between the buses 385 and 365. As the conductivity of the transistor 388 increases the potential of the bus 365 will increase. As the potential of bus 365 increases more current will flow through the Zener diode 380 thereby increasing the conductivity of the transistor 382 and the potential drop across the resistor 384. This limits the conduction of the transistor 388 so that the potential of the bus 365 is stabilized at an increased potential as determined by the position of the slider 378 on the resistor 376. If as suggested the potential supplied by the network 316 is 15 volts, the increased stabilized potential may be 20 volts.

The bus 365 is connected to bus 334 through a rectifier 390 which prevents current flow to the bus 365 but permits flow from the bus 365 to bus 334 when the potential of bus 365 is at its increased stabilized potential.

In order that the network 346 will operate in a switching mode, a resistor 392 is coupled between the bus 365 and the arm 360 of the potentiometer 358. When the network 346 is initially actuated by an increase in potential in the conductor 352, the potential of the bus 365 raises the potential of the arm 360 somewhat above the potential to which it was raised as a consequence of the increase in potential of the conductor 352. This added increase in potential insures the continued conduction of the Zener diode 364 and of the transistor 362 even though there should be a small reduction in the potential of the conductor 352.

The output voltages supplied to the error bridge 248 by the rectifiers 230, 232, and 234 is so related to that supplied by the rectifier 254 that at current values in the lines LA, LB, and LC of 200% or less of the rated line current and at rated voltage, the voltage supplied by the rectifier 254 is equal to or greater than that supplied by any of the rectifiers 230, 232, and 234. At currents greater than 200% of rated current, the voltage applied to the bridge 248 becomes greater and the current flow through the various windings 131 and 150 increases to reduce the conducting time of the transistors 78A, 78B, 80A, and 80B thereby reducing the output voltage of the inverter 1. The magnitude of the resistors 304, 306 and 380 are so chosen relative to the turns ratio of the transformers 32A, 32B, and 32C that the current through error bridge will increase sufficiently to prevent current flow of more than 300% of rated current even though the line conductors LA, LB, and/or LC are shorted together.

Figures 8, 9:
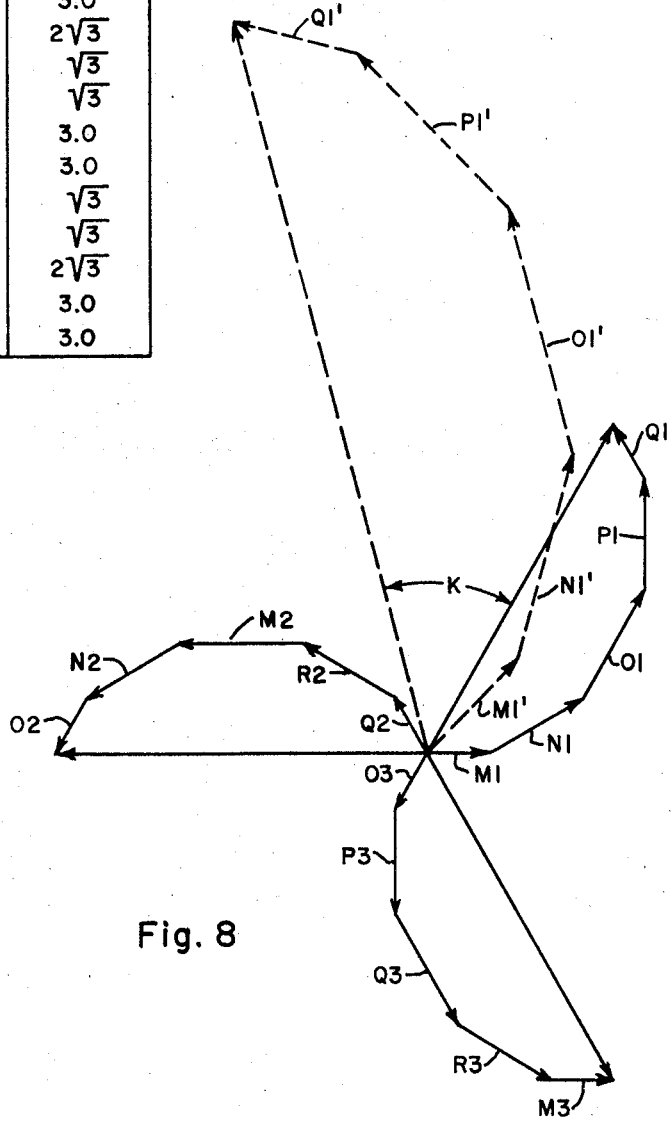
FIG. 8 is a vector diagram illustrating the phase relationship of the various output voltages of the inverter network of FIGS. 6A and 6B.
FIG. 9 is a table showing the relative magnitudes of the voltages for the various output windings of the voltage supplying transformers.

FIG. 8 illustrates, vectorially, the relationships of the various voltages which are supplied to the lines LA, LB, and LC. The vectors are identified by the same reference characters which identify the windings which supply the potential with the exception of the omission of the letter T in each instance. For example, the vectors M1, N1, O1, etc. designate respectively the potentials supplied by the windings TM1, TN1, TO1, etc. The number of turns of the various windings of the transformers TM–TR are such as to provide relative peak voltages of square waves as set forth in FIG. 9. The absolute RMS voltages will depend upon a scale factor and the length of time that current pulses are supplied to the transformers TM–TR.

At a first pulse time the voltages will be as illustrated by the unprimed reference characters while at an increased pulse time the magnitudes will be greater as indicated by the primed reference characters. The "primed" vectors for only one phase have been illustrated and it is to be distinctly understood that a similar change in the vector lengths will occur in the other two phases. The angle K of shift in absolute position of the phases (all still displaced equally at 120° intervals) is equal to half of the change in pulse duration expressed in electrical degrees. This mode of pulse-width-modulation is of the leading edge advance-or-retard type. Trailing-edge pulse-width-modulation would have moved the longer vector back instead of forward as shown in FIG. 8. Simultaneous and equal leading-edge and trailing-edge pulse-width-modulation by some other control scheme than the one shown would maintain identical direction for the range of magnitudes of voltage.

Figure 10:
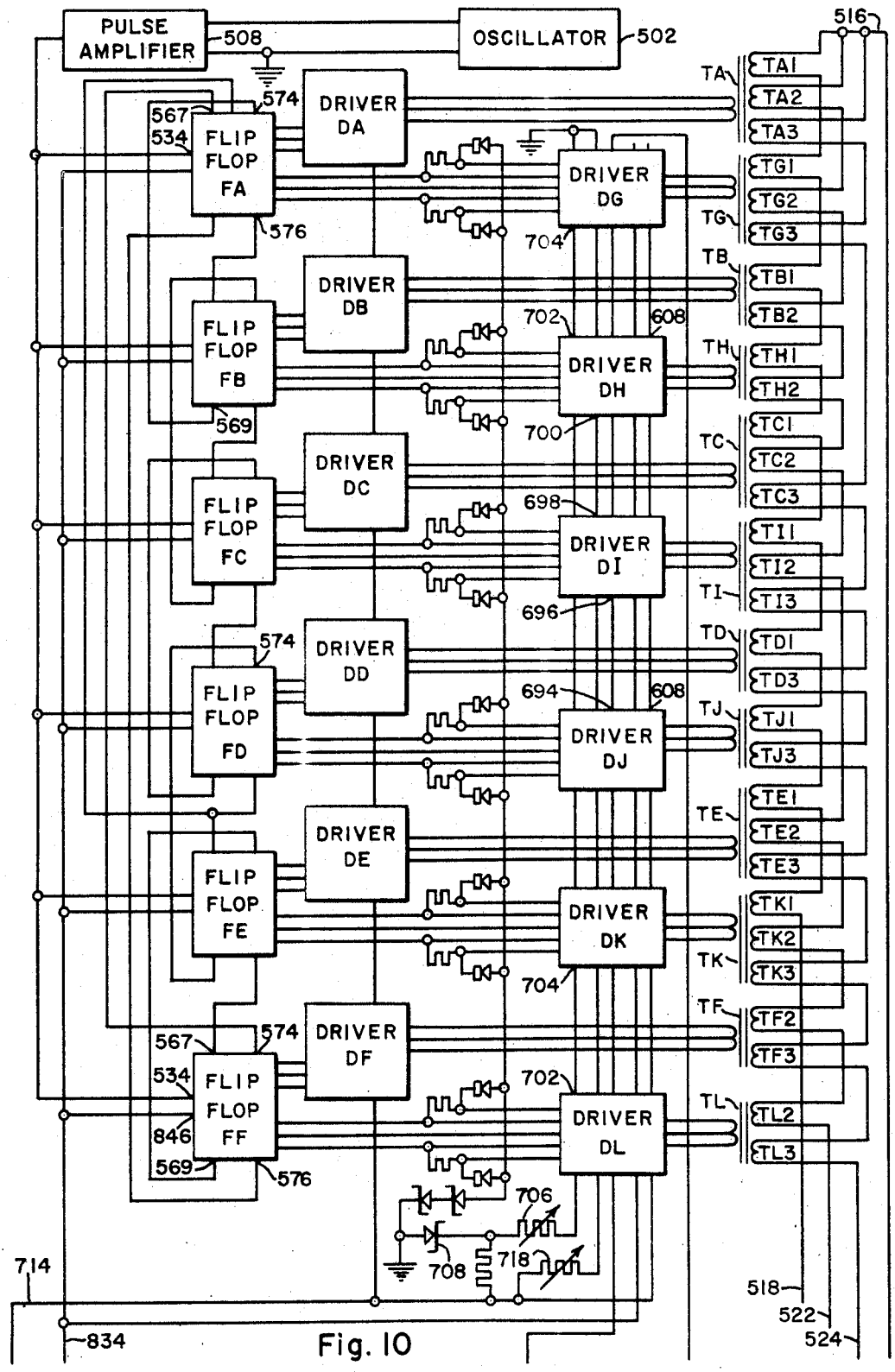
FIG. 10 illustrates a modified form of the circuitry of FIG. 6A and, when placed end-to-end with FIG. 6B, FIGS. 10 and 6B illustrate a modified form of polyphase inverter network embodying the invention.

The arrangement of the modification shown in FIG. 10 is in many respects similar to that shown in FIG. 6A and parts in FIG. 10, which correspond generally to parts identified by numerals in FIG. 6A will be identified by numerals which are 500 units higher than the corresponding numerals used in FIG. 6A. For example, the oscillator which sequentially drives the flip flops FA–FF in FIG. 10 is identified by numeral 502 while the corresponding oscillator in FIG. 6A is identified by numeral 2.

Figure 12:
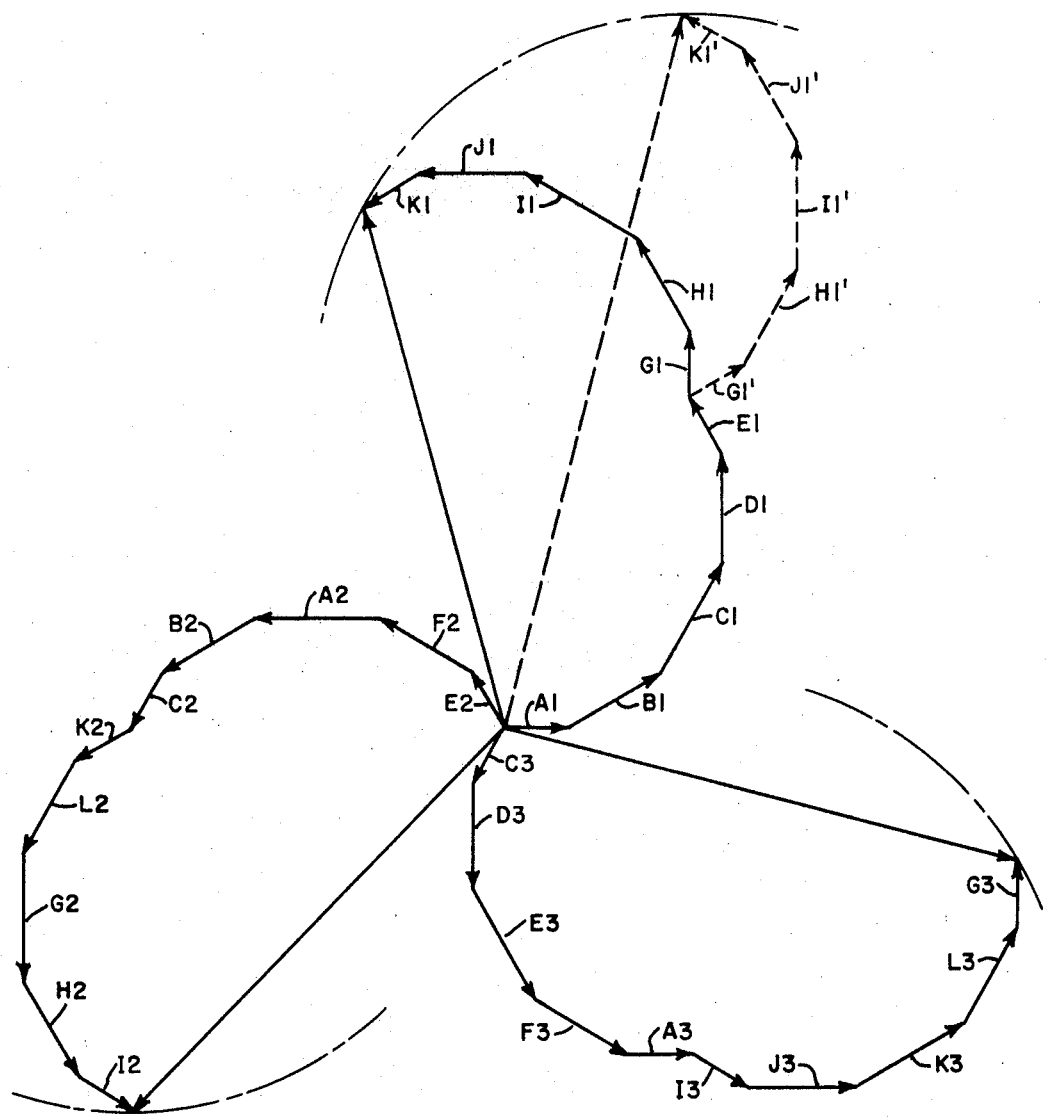
FIG. 12 is a vector diagram illustrating phase relationships of the output voltages of the inverter network of FIGS. 10 and 6B; and, FIG. 13 is a block diagram illustrating a further modified form of the portion of the invention illustrated in FIG. 6A and when placed end-to-end illustrates another form of the invention.

The major difference between the arrangement of FIG. 6A and FIG. 10 is the means for obtaining the voltage regulation. In FIG. 6A, the regulations of the output voltage of the polyphase inverter 1 was accomplished by controlling the length of the current pulses supplied to the transformers TM–TR as vectorially shown in FIG. 8. In the modification shown in FIG. 10, the output voltage of the inverter 501 is controlled by regulating the phase difference of the voltages supplied by the transformer TA–TF and TG–TL and vectorially illustrated in FIG. 12.

For purposes of easy understanding of the drawings, the various voltage producing transformers are identified by the letters TA–TL to relate them to the various drivers DA–DL with which they are associated. The output or secondary windings of the transformers TA–TL include the transformer designation of which they are a part plus a numeral by which the individual windings may be individually distinguished. For example, the secondary windings of transformer TA are designated TA1, TA2, and TA3 while those of transformer TB are designated TB1 and TB2.

Figure 11:
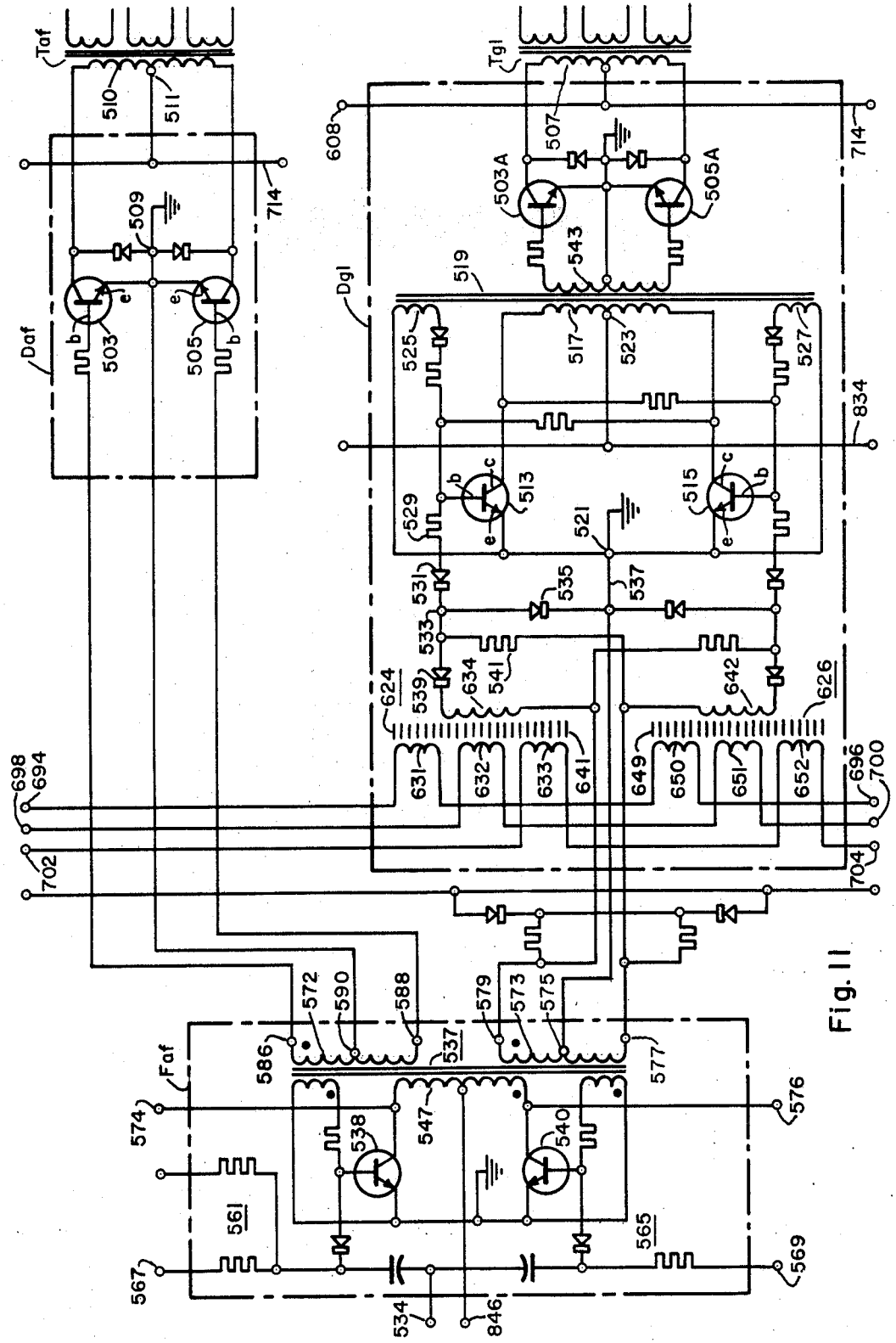
FIG. 11 illustrates, in schematic form, preferred circuits for certain of the elements shown in block form in FIG. 10.

As in FIG. 6A, the oscillator 502 drives a pulse amplifier 508 for supplying negative pulses of steep wave fronts to the signal input tterminals 534 of the flip flops FA–FF. These flip flops FA–FF are schematically identical to the flip flops FM–FR and are identified by the reference numeral F*af* in FIG. 11. The output windings 572 and 573 of the flip flops F*af* control the operation of the drivers DA–DF and DG–DL, respectively. The drivers DA–DF are identical and are schematically shown in FIG. 11 and identified by the reference character D*af*. These drivers energize the transformers TA–TF which are all schematically alike except that certain thereof require only two secondary windings and the third winding is therefore omitted. The transformer T*af* of FIG. 11 is representative of the transformers TA–TF. Likewise, the drivers DG–DL are identical and are schematically shown in FIG. 11 and identified as F*gl*. The transformers TG–TL are all schematically alike except for the number of secondary windings. These transformers TG–TL are designated T*gl* in FIG. 11.

The driver D*af* includes a pair of transistors 503 and 505 which are connected in push pull across the primary winding 510 of the transformer T*af* in common emitter connection. The power source 216 is connected between a grounded common emitter connection 509 and a center tap 511 of the winding 510. The bases *b* of the transistors 503 and 505 are individually connected through current limiting resistors to the end terminals 586 and 588 of the transformer 537. The control circuit for these transistors is completed by connecting the common connection 509 to the center terminal 590.

The driver D*gl* includes a pair of transistors 513 and 515 connected in push pull across the primary winding 517 of a transformer 519 in grounded common emitter connection. The source of power for the transformer 519 is connected between the common emitter connection 521 and the center tap 523 of the winding 517. The transformer 519 is provided with tertiary or feedback windings 525 and 527 which are individually connected respectively between the bases *b* and emitters *e* of the transistors 513 and 515. These windings 525 and 527 are so polarized that they tend to keep the conducting one of the transistors 525 or 527 conductive and the nonconducting one of the transistors 527 or 525 nonconductive.

The control signal for rendering the conducting one of the transistors 513 or 515 nonconducting is obtained from the transformer winding 573 through saturating core transformers 624 and 626. The base *b* of transistor 513 is connected through a current limiting resistor 529 and a rectifier 531 to a control terminal 533 which is connected through a rectifier 535 to a conductor 537 which connects the common point 521 to the center terminal 575 of the winding 573. The terminal 579 is connected through the primary winding 634 of transformer 624, and a rectifier 539 to the terminal 533. Terminal 533 is also connected to the lower end terminal 577 of the winding 573 through a voltage dropping resistor 541.

When the transformer 537 becomes energized, with the terminal 577 positive with respect to terminal 579, current flows through the resistor 541, rectifier 539, and winding 634 to terminal 579. The magnitude of this current is low with excess current passing through rectifier 535 to cause clamping to essentially the potential of bus 537 and terminal 575. Until the core 641 saturated, the terminal 533 remains sufficiently positive relative to the conductor 537 to permit the winding 525 to maintain the transistor 513 conductive (assuming that the transistor was initially conducting). When the core 641 saturates, the impedance of the winding 634 decreases substantially and the potential of the terminal 533 becomes substantially that of the terminal 579 which is negative with respect to the common emitter connection 521. This reduces the base current drive in the transistor 513 causing it to conduct less current to the winding 517 to further reduce the voltage generated in winding 525 and the base current drive in the transistor 513.

Because of the regenerative effect, the current through the transistor 513 promptly ceases and the flux in the core of transformer 519 starts to collapse. When this occurs, the voltage generated in the windings 525 and 527 reverses and winding 527 supplies base current to transistor 515 which begins to conduct. Because of the feedback of the winding 527, the transistor 515 quickly becomes fully conductive and the transformer 519 is provided with substantially the full potential of the source 216 which is applied thereto via bus 714. The potential developed in the winding 573 between the terminals 579 and 575 is applied to the transistor 515 in the same manner as described above. Therefore, when the core 649 saturates the transistor 515 is rendered nonconducting and the transistor 513 will conduct fully as a consequence thereof and vice versa.

The transformer 519 is provided with a center tapped output or secondary winding 543. The winding 543 is connected to the base-emitter circuits of a pair of transistors 503A and 505A for controlling the conduction thereof in the same way as the winding 572 controls the transistors 503 and 505. Similarly, the emitter-collector circuits of transistors 503A and 505A are connected in push-pull with the primary winding 507 of the transformer T*gl* and to the source of potential 216 in the same manner as the emitter-collector circuits of transistors 503 and 505 are connected to the transformer T*af* and the source of potential 216.

It will now be appreciated that the transformers TA–TF and their respective drivers DA–DF will be operated in phase with the flip flops FA–FF while the transformers TG–TL and their respective drivers DG–DL will be operated by the flip flops FA–FF respectively but at a phase relation with respect thereto which is determined by the time lag caused by the presence of the saturating transformers 624 and 626. By properly controlling the DC current through the windings 631–650; 632–651; and/or 633–652 this phase difference can be varied from zero to any desired angle up to 180°.

The windings T1, T2, and/or T3 of the transformers TA–TF are connected in series in the same manner as described above in connection with the embodiment of FIG. 6A. Furthermore, the relative voltages of the various windings of the transformers TA–TF are the same as those of the transformers TM–TR of FIG. 6A. The windings T1, T2, and/or T3 of the transformers TG–TL have the same voltage relationships as the corresponding windings of the transformers TA–TF and are individually connected in series with their respective counterparts. With this arrangement and by changing the phasing of the drivers TG–TL with respect to the drivers TA–TF, the output voltage of the lines LA, LB and LC may be regulated as vectorially shown in FIG. 12. The change may be from a maximum potential in which the voltage of the transformers TA–TF and TF–TL are additive to a minimum potential in which the voltages are in phase opposition. It will be appreciated that while the 120° phase differential is maintained between the line voltages, the phase of the line voltages with respect to the oscillator will vary. This variation in most instances is not objectionable.

Figure 13:
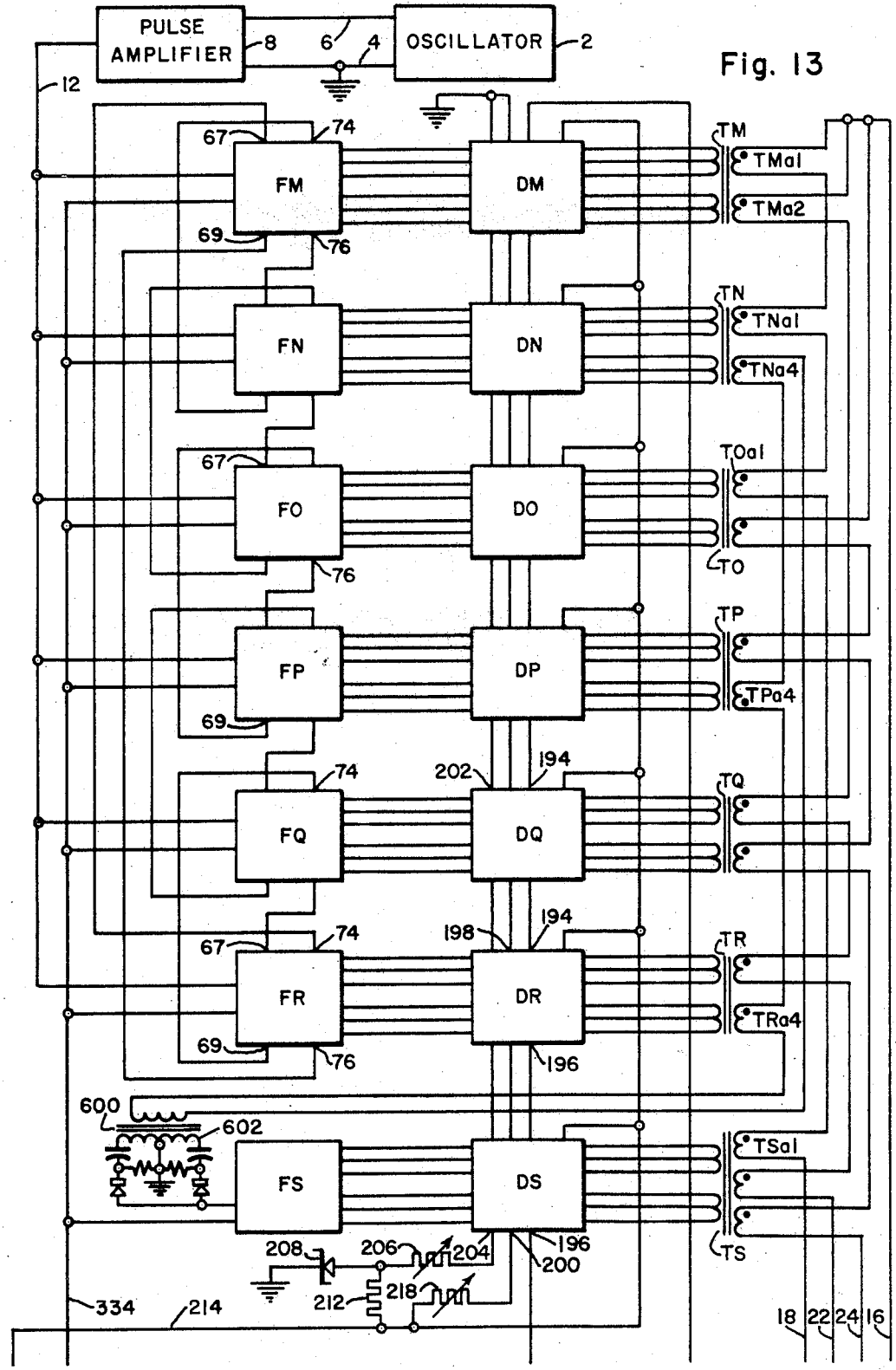

In FIGS. 13 and 6B there is shown, a further modified form of the invention in which each phase comprises the output of three square wave generators or stages plus a square wave having a frequency which is three times the frequency of the other three square waves. The elements of FIG. 13 which corresponds to similar elements of FIG. 6A are identified by the same reference characters. The flip flop FS and driver DS are identical to the other flip flops and drivers FM–FR and DM–DR except that the

17 windings 131, 132, 133, 150, 151, and 152 of the saturating transformers 124 and 126 of drivers DS are arranged to provide a delay time which will delay the higher frequency square wave by the same proportionate interval that the saturating transformers 124 and 126 of the drives DM–DR delay the lower frequency square waves. The control signal for driving the flip flop FS is derived from the sum of the square waves generated in the windings TN$a$4, TP$a$4 and TR$a$4 transformers TN, TP and TR which is a square wave of the third harmonic frequency and having a phase angle of 30 degrees lagging with respect to the voltage of transformer TM. This signal is supplied to a transformer 600 having a secondary winding 602 with a grounded center tap. The end terminals of the winding 602 are connected through individual rectifiers and capacitors to the signal input terminal 34 of the flip flop FS whereby the flip flop is actuated at three times the frequency of the other flip flops FM–FR.

If the relative magnitude of the three lower frequency square waves are $0°=1$; $30°=\sqrt{3}$; and $60°=1$ with the higher frequency wave having a magnitude of $\sqrt{3}/3$, the output wave shape and neutralized harmonics are exactly the same as is obtained from the six stage apparatus disclosed in FIGS. 6A and 6B, wherein M$a$, N$a$, O$a$, and S$a$ represent the output voltages of the transformers TM, TN, TO, and TS and the wave LA the voltage between conductors 18 and 16. The wave shape of the output voltage between conductors 22–16 and 30–16 of FIGS. 13 and 6B are identical to that between the conductors 18 and 16 except for their phase positions.

Although the invention has been described with reference to certain specific embodiments thereof, numerous modifications are possible and it is desired to cover all modifications falling within the spirit and scope of the invention.

What is claimed and is desired to be covered by United States Letter Patent is as follows:

1. In an apparatus for inverting unidirectional potential into alternating potential of a predetermined frequency, an N number of phase displaced voltage generators, N being at least 3, each said generator having a square shaped output voltage wave of said predetermined frequency, and means combining the outputs of said generators to produce a resulting voltage wave of stepped configuration, the magnitudes of said output voltage waves being so related to the magnitudes of the phase displacement of said generators that said resulting wave generally follows the configuration of a sine wave and contains a lesser quantity of harmonics than are contained in said output waves of said generators.

2. The combination of claim 1 in which there is provided means actuating said generators in succession at intervals of $180°/N$.

3. The combination of claim 1 in which there is provided means actuating said generators in succession at intervals of $180°/(N+1)$.

4. In an apparatus for inverting unidirectional potential into alternating potential; a pair of output connections; at least 3 inverting networks; each said network comprising a pair of input terminals adapted to be energized from a source of unidirectional potential, a pair of output terminals, and first and second current conducting paths connecting said input terminals to said output terminals; each said path including a current controlling device having a closed circuit condition in which said path is effective to conduct and an open circuit condition in which said path is ineffective to conduct substantial current; each of said first paths being effective when its said device is conducting to energize its said output terminals in a first polarity; each of said second paths being effective when its said device is conducting to energize its said output terminals in a second polarity; means sequentially rendering all of said first paths conducting in a predetermined timed sequence and thereafter all of said second paths conducting in said predetermined timed sequence in a chain-like manner; and means connecting at least certain of said pairs of output terminals in additive series arrangement between said output connections, said certain terminals being those of certain of said inverting networks selected from those of said networks having a total phase displacement which is not in excess of 180 degrees.

5. In an apparatus for inverting unidirectional potential into alternating potential, and N number of square wave voltage sources, means interlocking said sources whereby the said sources are actuated in sequence to provide a series of voltages of a first polarity and thereafter of a second polarity, said interlocking means being so arranged that the time intervals between the voltage changes of any two adjacent successive-to-be-actuated ones of said sources is equal to $\pi/N$ radians, a P number of series connected groups of said sources, each said group being arranged to be energized by the combined voltages of the said sources which comprise the respective said group, each said group comprising voltages from all of and solely those of the said sources which change in potential from said first to said second polarity within a time interval not greater than $\pi/2$ radians from the point at which said respective group voltage changes polarity and which voltages have an appreciable magnitude, the angular displacement between the instant at which any two adjacent successive groups of said voltage waves change from said first to a second polarity being $2\pi/P$ radians, the magnitudes of the output voltages of said source of any said group being represented by the arithmetic product of $(1-\cos \pi/N)$ and the cosine of the electrical angle between the point at which the respective said group voltage changes polarity from said first to said second polarity and the point at which the particular source within said respective group changes from said first to said second polarity.

6. In an apparatus for inverting unidirectional potential into alternating potential, an N number of square wave voltage sources, the voltage of each said source having a phase angle with respect to an arbitrary reference and a predetermined magnitude, means interlocking said sources whereby the said sources are actuated in sequence to provide a series of voltages of a first polarity and thereafter of a second polarity, said interlocking means being so arranged that the time intervals between the voltage changes of any two of said sources is equal to $\pi/N$ radians, a P number of series connected groups of said output terminals to provide a P number of group output voltages each having a phase angle with respect to said reference, each said group being arranged to be energized by the combined voltages of said sources which comprise the respective said group, each said group comprising the said sources which have their phase angles electrically spaced less than $\pi/2$ radians from said phase angle of the respective said group of which it is a part the difference in phase angle between phase angles of any two adjacent successive said groups being $2\pi/P$ radians, the magnitudes of said voltages of said sources of any said group being represented by the arithmetic product of $(1-\cos \pi/N)$ and the cosine of the difference in said phase angle between that of the particular group and that of said particular source of said particular group, said phase angle of each said group being located $\pi/2$ radians away from said phase angle of the said sources included in the respective said group.

7. In an apparatus for inverting unidirectional potential into alternating potential; a pair of output connections; an N number of inverting networks; each said network comprising a pair of input terminals adapted to be energized from a source of unidirectional potential, a pair of output terminals, and first and second current conducting paths connecting said input terminals to said output terminals; each said path including a current controlling device having a closed circuit condition in which said path is effective to conduct and an open circuit condition in which said path is ineffective to conduct substantial current; means sequentially rendering said first paths conducting and thereafter said second paths conducting in timed sequence; said timed sequence at which said second paths are rendered; and means connecting said pairs of output terminals in series between said output connections; the potentials between said pairs of output terminals being so related that all of the harmonics in the voltage appearing between said output connections below a value $2N-1$ are neutralized.

8. In an apparatus for inverting unidirectional potential into alternating potential; a pair of output connections; an N number of inverting networks; each said network comprising a pair of input terminals adapted to be energized from a source of unidirectional potential, a pair of output terminals, and first and second current conducting paths connecting said input terminals to said output terminals; each said path including a current controlling device having a closed circuit condition in which said path is effective to conduct and an open circuit condition in which said path is ineffective to conduct substantial current; means sequentially rendering said current controlling devices of said first paths in closed circuit condition and said current controlling device of said second paths in open circuit conditions in timed sequence; said sequentially rendering means thereafter rendering said current controlling devices of said second paths in closed circuit conditions and said current controlling devices of said first paths in open circuit condition in timed sequence; said sequentially rendering means providing a greater time interval between the rendering conductive of the last to be rendered conductive of said first paths and the rendering conductive of the first to be rendered conductive of said second paths than the time interval of said timed sequence at which said first paths are rendered conductive, said sequentially rendering means also providing a greater time interval between the rendering conductive of the last to be rendered conductive of said second paths and the rendering conductive of the first to be rendered conductive of said first paths than the time interval of said timed sequence at which said second paths are rendered conductive, and means connecting said pairs of output terminals in series between said output connections, the potential between one of said pair of output terminals being 90° out of phase with respect to the phase of the potential between said output connections, the potentials between said pairs of output terminals of said inverters being proportioned to provide an output wave shape in which all of the harmonics below a value $2N-1$ are neutralized.

9. In an apparatus for inverting unidirectional potential into alternating potential; a pair of output connections; a plurality of inverter networks; each said network comprising a pair of input terminals adapted to be energized from a source of unidirectional potential, a transformer having primary winding means and secondary winding means, and first and second current conducting paths connecting said input terminals to said primary winding means; each said path including current controlling means having a closed circuit condition in which said path is effective to conduct and an open circuit condition in which said path is ineffective to conduct substantial current; each said controlling means having a control circuit operable upon a change in the energization thereof to place the associated said controlling means in its said closed circuit condition; means generating a series of equally spaced impulses, interconnecting means including time delay means connecting said generating means to said controlling means for changing the energization of said controlling means whereby said controlling means are placed in their said closed circuit conditions; said interconnecting means further including gating means whereby solely one of said controlling means is rendered effective for each said impulse; said gating means being effective to render said generating means effective to actuate sequentially into their said closed conditions said controlling means associated with said first paths and to thereafter actuate sequentially into their said closed conditions said controlling means associated with said second paths; each said inverter network including an impedance controlling means connected to one of said winding means whereby the impedance of said secondary winding means to current flow may be reduced; means connecting said secondary winding means in series circuit to said output connections; and means actuated in timed sequence with the magnitude of the delay afforded by said time delay means for actuating said impedance controlling means to reduce the impedance of said secondary winding means for an interval equivalent to the magnitude of said delay afforded by said time delay means.

10. In an apparatus for inverting unidirectional potential into alternating potential; a pair of output connections; a plurality of inverter networks; each said network comprising a pair of input terminals adapted to be energized from a source of unidirectional potential, a transformer having primary winding means and secondary winding means, and first and second current conducting paths connecting said input terminals to said primary winding means; each said path including current controlling means having a closed circuit condition in which said path is effective to conduct and an open circuit condition in which said path is ineffective to conduct substantial current; each said controlling means having a control circuit operable upon a change in the energization thereof to place the associated said controlling means in its said closed circuit condition; means generating a series of equally spaced impulses, interconnecting means including time delay means connecting said generating means to said controlling means for changing the energization of said controlling means whereby said controlling means are placed in their said closed circuit conditions; said interconnecting means further including gating means whereby solely one of said controlling means is rendered effective for each said impulse; said gating means being effective to render said generating means effective to actuate sequentially into their said closed conditions said controlling means associated with said first paths and to thereafter actuate sequentially into their said closed conditions said controlling means associated with said second paths; said gating means acting to provide a double length time interval between the actuation of said controlling means associated with said first paths and the actuation of said controlling means associated with said second paths; said gating means acting to actuate said controlling means of said second paths in the same sequence as said controlling means of said first paths; each said inverter network including an impedance controlling means connected to one of said winding means whereby the impedance of said secondary winding means to current flow may be reduced; means connecting said secondary winding means in series circuit to said output connections; and means actuated in timed sequence with the magnitude of the delay afforded by said time delay means for actuating said impedance controlling means to reduce the impedance of said secondary winding means for an interval equivalent to the magnitude of said delay afforded by said time delay means.

11. In an apparatus for inverting unidirectional potential into polyphase alternating potential; a plurality of output conductors; a plurality of flip flop devices; each said flip flop device having power output terminals, power input terminals, control input terminals, and a pair of current paths interconnecting said power input terminals with said power output terminals; each said path including a current controlling device having a control circuit and a power circuit controlling current flow through the said path with which said current device is associated; each said flip flop device including means connecting said control circuits of its said current controlling devices to its said control input terminals; and output transformer individual to each said flip flop device; each said transformer including input and output winding means; a plurality of network means individually connecting said transformers to said flip flop devices; control means connected to said control input terminals and operable to actuate a first, a second, a third, a fourth, a fifth, and a sixth of said flip flops in sequence from a first operating condition in which first paths are nonconducting and said second paths are conducting into a second operating condition in which said second paths are nonconducting and said first paths are conducting; said control means thereafter being operable to actuate said first, said second, said third, said fourth, said fifth and said sixth flip flop in sequence from their said second operating conditions to their said first operating conditions; each said network means being arranged to energize its said transformer at a first polarity as a consequence of its said flip flop being actuated to its said first operating condition and at a second polarity as a consequence of its said flip flop being actuated to its said second operating condition; means connecting a first portion of said output winding means of said first, said second, said third, said fourth, and said fifth transformer in between a first pair of said plurality of conductors; means connecting a second portion of said output winding means of said fifth, said sixth, said first, said second, and said third transformers between a second pair of said plurality of conductors; and means connecting a third portion of said output winding means of said third, said fourth, said fifth, said sixth, and said first transformer between a third pair of said plurality of conductors.

12. In an apparatus for inverting unidirectional potential into polyphase alternating potential; a plurality of output conductors; a plurality of flip flop devices; each said flip flop device having power output terminals, power input terminals, control input terminals, and a pair of current paths interconnecting said power input terminals with said power output terminals; each said path including a current controlling device having a control circuit and a power circuit controlling current flow through the said path with which said current device is associated; each said flip flop device including means connecting said control circuits of its said current controlling devices to its said control input terminals; and output transformer individual to each said flip flop device; each said transformer including input and output winding means; a plurality of network means individually connecting said transformers to said flip flop devices; control means connected to said control input terminals and operable to actuate a first, a second, a third, a fourth, a fifth, and a sixth of said flip flops in sequence from a first operating condition in which first paths are nonconducting and said second paths are conducting into a second operating condition in which said second paths are nonconducting and said first paths are conducting; said control means thereafter being operable to actuate said first, said second, said third, said fourth, said fifth and said sixth flip flop in sequence from their said second operating conditions to either said first operating conditions; each said network means being arranged to energize its said transformer at a first polarity as a consequence of its said flip flop being actuated to its said first operating condition and at a second polarity as a consequence of its said flip flop being actuated to its said second operating condition; means connecting a first portion of said output winding means of said first, said second, said third, said fourth, and said fifth transformer in between a first pair of said plurality of conductors; means connecting a second portion of said output winding means of said fifth, said sixth, said first, said second, and said third transformers between a second pair of said plurality of conductors; means connecting a third portion of said output winding means of said third, said fourth, said fifth, said sixth, and said first transformer between a third pair of said plurality of conductors, voltage regulating means operatively associated with said power input terminals for controlling the magnitude of the potential supplied to said flip flop; and means responsive to an operating condition of said output conductors for controlling said regulating means.

13. In an apparatus for inverting unidirectional potential into polyphase alternating potential; a plurality of output conductors; a plurality of flip flop devices; each said flip flop device having power output terminals, power input terminals, control input terminals, and a pair of current paths interconnecting said power input terminals with said power output terminals; each said path including a current controlling device having a control circuit and a power circuit controlling current flow through the said path with which said current device is associated; each said flip flop device including means connecting said control circuits of its said current controlling devices to its said control input terminals; and output transformer individual to each said flip flop device; each said transformer including input and output winding means; a plurality of network means individually connecting said transformers to said flip flop devices; control means connected to said control input terminals and operable to actuate a first, a second, a third, a fourth, a fifth, and a sixth of said flip flops in sequence from a first operating condition in which paths are nonconducting and said second paths are conducting into a second operating condition in which said second paths are nonconducting and said first paths are conducting; said control means thereafter being operable to actuate said first, said second, said third, said fourth, said fifth and said sixth flip flop in sequence from their said second operating conditions to their said first operating conditions; each said network means being arranged to energize its said transformer at a first polarity as a consequence of its said flip flop being actuated to its said first operating condition and at a second polarity as a consequence of its said flip flop being actuated to its said second operating condition; means connecting a first portion of said input winding means of said first, said second, said third, said fourth, and said fifth transformer in between a first pair of said plurality of conductors; means connecting a second portion of said output winding means of said fifth, said sixth, said first, said second, and said third transformers between a second pair of said plurality of conductors; means connecting a first portion of said output winding means of said third, said fourth, said fifth, said sixth, and said first transformer between a third pair of said plurality of conductors, voltage regulating means operatively associated with said power input terminals; said regulating means having a first operating conditions in which potential of a first magnitude is supplied to said flip flop and a second condition in which potential of a second magnitude is supplied to said flip flops; and means responsive to current flow in at least one of said output conductors for determining the one of said operating conditions of said voltage regulating means which is effective.

14. In a network for inverting unidirectional potential to alternating polarity; a flip flop network; a driver network; an output transformer having input winding means and output winding means; said flip flop network comprising a pair of power input terminals, adapted to be connected to a source of unidirectional potential, first and second groups of power output terminals, a control input terminal, a pair of current controlling devices each having a main current path and a pair of control terminals, a first current conducting path connecting said input terminals to each of said groups of output terminals and including said current path of a first of said pair of current controlling devices, a second current conducting path connecting said input terminals to each of said groups of output terminals and including said current path of a second of said pair of current controlling devices, said second path being operative to energize said output terminals at a polarity different from the energization thereof by said first path; means operatively connected to said terminals of said current controlling devices and effective to periodically reverse the relative conductive conditions of said main current paths; said driver network comprising a pair of power input terminals, a group of power output terminals, a pair of current controlling devices having power paths and control terminals, a first power path connecting said driver input terminals to said driver output terminals and including said power paths of a first of said pair of driver current controlling devices, a second power path connecting said driver input terminals to said driver output terminals and including said power path of a second of said pair of driver current controlling devices, said second path of said driver being effective to energize said output terminals of said driver at a polarity opposite to the energization of said first path of said driver; means including time delay means interconnecting said control terminals of said driver to said first group of output terminals of said flip flop network and effective at one polarity of energization of said first group of flip flop output terminals to render said power path of said first current controlling device of said driver conductive and effective at the opposite polarity of energization of said first group of flip flop output terminals to render said power path of said second current controlling device of said driver conductive; means connecting said input winding means of said transformer to said output terminals of said driver for energization of said transformer at alternating polarities as a consequence of the alternating polarity of energization of said driver output terminals; a switching network connected across at least a portion of one of said winding means of said transformer and having current conducting and a current interrupting operating conditions; and means actuated by said time delay means connecting said second group of output terminals to said switching network and effective to maintain said switching network in its said current conducting condition during the timing out period of said time delay means and thereafter to maintain said switching network in its said current interrupting condition.

15. In a network for inverting unidirectional potential to alternating polarity; a flip flop network; a driver network; an output transformer having input winding means and output winding means; said flip flop network comprising a pair of power input terminals, adapted to be connected to a source of unidirectional potential, first and second groups of power output terminals, a control input terminal, a pair of current controlling devices each having a main current path and a pair of control terminals, a first current conducting path connecting said input terminals to each of said groups of output terminals and including said current path of a first of said pair of current controlling devices, a second current conducting path connecting said input terminals to each of said groups of output terminals and including said current path of a second of said pair of current controlling devices, said second path being operative to energize said output terminals at a polarity different from the energization thereof by said first path; means operatively connected to said terminals of said current controlling devices and effective to periodically reverse the relative conductive conditions of said main current paths; and driver network comprising a pair of power input terminals, a group of power output terminals, a pair of current controlling devices having power paths and control terminals, a first power path connecting said driver input terminals to said driver output terminals and including said power paths of a first of said pair of driver current controlling devices, a second power path connecting said driver input terminals to said driver output terminals and including said power path of a second of said pair of driver current controlling devices, said second path of said driver being effective to energize said output terminals of said driver at a polarity opposite to the energization of said first path of said driver; means including time delay means interconnecting said control terminals of said driver to said first group of output terminals of said flip flop network and effective at one polarity of energization of said first group of flip flop output terminals to render said power path of said first current controlling device of said driver conductive and effective at the opposite polarity of energization of said first group of flip flop output terminals to render said power path of said second current controlling device of said driver conductive; means connecting said input winding means of said transformer to said output terminals of said driver for energization of said transformer at alternating polarities as a consequence of the alternating polarity of energization of said driver output terminals; a switching network connected across at least a portion of one of said winding means of said transformer and having current conducting and a current interrupting operating conditions; means actuated by said time delay means connecting said second group of output terminals to said switching network and effective to maintain said switching network in its said current conducting condition during the timing out period of said time delay means and thereafter to maintain said switching network in its said current interrupting condition; and means responsive to an operating characteristic of said output winding of said transformer for regulating the voltage applied to said input terminals of said flip flop.

16. In a network for inverting unidirectional potential to alternating polarity; a flip flop network; a driver network; an output transformer having input winding means and output winding means; said flip flop network comprising a pair of power input terminals, adapted to be connected to a source of unidirectional potential, first and second groups of power output terminals, a control input terminal, a pair of current controlling devices each having a main current path and a pair of control terminals, a first current conducting path connecting said input terminals to each of said groups of output terminals and including said current path of a first of said pair of current controlling devices, a second current conducting path connecting said input terminals to each of said groups of output terminals and including said current path of a second of said pair of current controlling devices, said second path being operative to energize said output terminals at a polarity different from the energization thereof by said first path; means operatively connected to said terminals of said current controlling devices and effective to periodically reverse the relative conductive conditions of said main current paths; said driver network comprising a pair of power input terminals, a group of power output terminals, a pair of current controlling devices having power paths and control terminals, a first power path connecting said driver input terminals to said driver output terminals and including said power paths of a first of said pair of driver current controlling devices, a second power path connecting said driver input terminals to said driver output terminals and including said power path of a second of said pair of driver current controlling devices, said second path of said driver being effective to energize said output terminals of said driver at a polarity opposite to the energization of said first path of said driver; means including time delay means interconnecting said control terminals of said driver to said first group of output terminals of said flip flop network and effective at one polarity of energization of said first group of flip flop output terminals to render said power path of said first current controlling device of said driver conductive and effective at the opposite polarity of energization of said first group of flip flop output terminals to render said power path of said second current controlling device of said driver conductive; said time delay means being adjustable to adjust the length of its timing out periods; means connecting said input winding means of said transformer to said output terminals of said driver for energization of said transformer at alternating polarities as a consequence of the alternating polarity of energization of said driver output terminals; a switching network connected across at least a portion of one of said winding means of said transformer and having current conducting and a current interrupting operating conditions; means actuated by said time delay means connecting said second group of output terminals to said switching network and effective to maintain said switching network in its said current conducting condition during the timing out period of said time delay means and thereafter to maintain said switching network in its said current interrupting condition; and means responsive to an increase in the magnitude of current flowing in one of said transformer winding means above a first predetermined maximum current magnitude for increasing said timing out period of said time delay means.

17. In a network for inverting unidirectional potential to alternating polarity; a flip flop network; a driver network; an output transformer having input winding means and output winding means; said flip flop network comprising a pair of power input terminals, adapted to be connected to a source of unidirectional potential, first and second groups of power output terminals, a control input terminal, a pair of current controlling devices each having a main current path and a pair of control terminals, a first current conducting path connecting said input terminals to each of said groups of output terminals and including said current path of a first of said pair of current controlling devices, a second current conducting path connecting said input terminals to each of said groups of output terminals and including said current path of a second of said pair of current controlling devices, said second path being operative to energize said output terminals at a polarity different from the energization thereof by said first path; means operatively connected to said terminals of said current controlling devices and effective to periodically reverse the relative conductive conditions of said main current paths; said driver network comprising a pair of power input terminals, a group of power output terminals, a pair of current controlling devices having power paths and control terminals, a first power path connecting said driver input terminals to said driver output terminals and including said power paths of a first of said pair of driver current controlling devices, a second power path connecting said driver input terminals to said driver output terminals and including said path of a second of said path of driver current controlling devices, said second path of said driver being effective to energize said output terminals of said driver at a polarity opposite to the energization of said first path of said driver; means including time delay means interconnecting said control terminals of said driver to said first group of output terminals of said flip flop network and effective at one polarity of energization of said first group of flip flop output terminals to render said power path of said first current controlling device of said driver conductive and effective at the opposite polarity of energization of said group of flip flop output terminals to render said power path of said second current controlling device of said driver conductive; said time delay means being adjustable to adjust the length of its timing out periods; means connecting said input winding means of said transformer to said output terminals of said driver for energization of said transformer at alternating polarities as a consequence of the alternating polarity of energization of said driver output terminals; a switching network connected across at least a portion of one of said winding means of said transformer and having current conducting and a current interrupting operating conditions; means actuated by said time delay means connecting said second group of output terminals to said switching network and effective to maintain said switching network in its said current conducting condition during the timing out period of said time delay means and thereafter to maintain said switching network in its said current interrupting condition; and means responsive to an increase in the magnitude of current flowing in one of said transformer winding means above a first predetermined maximum current magnitude for increasing said timing out period of said time delay means; and means responsive to an increase in the magnitude of current flowing in one of said transformer winding means above a second predetermined maximum current magnitude less than said first predetermined magnitude for increasing the voltage supplied to said power input terminals of said flip flop.

18. In a network for inverting unidirectional potential to alternating polarity; a flip flop network; a driver network; an output transformer having input winding means and output winding means; said flip flop network comprising a pair of power input terminals, adapted to be connected to a source of unidirectional potential, first and second groups of power output terminals, a control input terminal, a pair of current controlling devices each having a main current path and a pair of control terminals, a first current conducting path connecting said input terminals to each of said groups of output terminals and including said current path of a first of said pair of current controlling devices, a second current conducting path connecting said input terminals to each of said groups of output terminals and including said current path of a second of said pair of current controlling devices, said second path being operative to energize said output terminals at a polarity different from the energization thereof by said first path; means operatively connected to said terminals of said current controlling devices and effective to periodically reverse the relative conductive conditions of said main current paths; said driver network comprising a pair of power input terminals, a group of power output terminals, a pair of current controlling devices having power paths and control terminals, a first power path connecting said driver input terminals to said driver output terminals and including said power paths of a first of said pair of driver current controlling devices, a second power path connecting said driver input terminals to said driver output terminals and including said power path of a second of said path of driver current controlling devices, said second path of said driver being effective to energize said output terminals of said driver at a polarity opposite to the energization of said first path of said driver; first and second saturating core inductive devices; each said saturating devices having a plurality of control windings inductively coupled together through said core; means including one of said control windings of said first saturating device interconnecting said control terminals of said driver to said first group of output terminals of a first of said current controlling devices of said flip flop network and effective at one polarity of energization of said first group of flip flop output terminals to render said power path of said first current controlling device of said driver conductive means including one of said control windings of said second saturating device interconnecting said control terminals of a second of said current controlling device of said driver to said first group of output terminals of said flip flop network and effective at the opposite polarity of energization of said first group of flip flop output terminals to render said power path of said second current controlling device of said driver conductive; means connecting said input winding means of said transformer to said output terminals of said driver for energization of said transformer at alternating polarities as a consequence of the alternating polarity of energization of said driver output terminals; a switching network connected across at least a position of one of said winding means of said transformer and having current conducting and a current interrupting operating conditions; means actuated by a second of said control windings of each of said saturating devices and effective to maintain said switching network in its said current conducting condition prior to saturation of said devices and thereafter to maintain said switching network in its said current interrupting condition; means connected to a third control winding of each of said devices and responsive to an increase in the magnitude current flowing in one of said transformer winding means above a first predetermined maximum current magnitude to alter the energization of said third control windings to increase the current flow through said first control windings necessary to saturate said cores; and means responsive to the magnitude of current flowing in one of said transformer winding means above a second predetermined maximum current magnitude to increase the potential supplied to said power input terminals of said flip flop network; said second magnitude being less than said first magnitude.

19. In an apparatus for inverting unidirectional potential into alternating potential, N number of square wave voltage sources each having an output voltage of predetermined magnitude, means phasing said sources such that the phase angle between the vectors of any two adjacent succesive voltages of said output voltages starting with a first thereof and ending with the Nth thereof are equal to each other, said angles being of a magnitude between $\pi/N$ and $\pi/N+1$ radians, a pair of output terminals, and means conecting said output voltages of all of said sources in additive series circuit between said terminals to provide a stepped voltage wave approximating a sine wave, said predetermined magnitude of each of said N sources satisfying the equations $M_x = (1 - \cos \phi)$ where $M_x$ equals the relative magnitude of the square wave of any source $x$ having an acute phase angle $\theta_x$ with respect to a voltage vector which is located centrally of and at an acute angle to all of said voltage vectors of said sources and where $\phi$ equals said angle between said adjacent successive sources.

20. In an apparatus for inverting unidirectional potential into alternating potential, N number of square wave voltage sources each having an output voltage of predetermined magnitude, means phasing said sources such that the phase angle between the vectors of any two adjacent successive voltages of said output voltages starting with a first thereof and ending with the Nth thereof are equal to each other, a pair of output terminals, and means connecting in series additive relation the output voltages of all of and solely those of said voltage sources which lie within an angle between plus and minus 90° of the phase angle of the vector of the voltage which exists between said output terminals and which have a substantial magnitude, said predetermined magnitude of each said source satisfying the equation $M_x = (1 \cos \pi/N) \cos (\theta_x)$ where $M_x$ equals the relative magnitude of the square wave of source $x$ having an acute phase angle $\theta_x$ with respect to the phase of said sine wave at said output terminals.

21. In an apparatus for inverting unidirectional potential into polyphase alternating potential of P phases; P pairs of output connections for said alternating potential; an N number of inverter networks; each said network comprising a pair of input terminals adapted to be energized from a source of unidirectional potential, a transformer having primary winding means and secondary winding means, and first and second current conducting paths connecting said input terminals to said primary winding means; each said path including current controlling means having a closed circuit condition in which said path is effective to energize said primary winding means to induce a voltage in its associated said secondary winding means and an open circuit condition in which said path is effective to conduct substantial current; the instantaneous polarity of the voltage induced in said secondary winding means being dependent upon the relative conductive conditions of the said first and second paths with which said transformer is associated; means associated with said current controlling means and effective to render sequentially into closed circuit conditions said current controlling means associated with said first paths and thereafter to render sequentially into closed circuit condition said current controlling means associated with said second paths; the interval between the rendering of any two successive current controlling means into their closed circuit conditions being equal; circuit means individually connecting together in series additive relation portions of said secondary winding means to provide groups; said groups being individually connected between said P pairs of output connections; each said group including portions of said secondary winding means of at least $N-1$ of said transformers; the magnitudes of the output voltages derived from said secondary winding means portions satisfying the equation $M_x = (1 - \cos \pi/N) \cos \theta_x$ where $M_x$ equals the amplitude of the voltage of a secondary winding portion $x$ having an acute phase angle $\theta_x$ with respect to the phase angle of the voltage to be established between the said pairs of output connections with which said secondary winding portion $x$ is associated.

22. The combination of claim 21 in which $N/P$ is an integer and in which the phase angle between any two successive adjacent voltages at said output connections is equal to $2\pi/P$ and in which the phase of the output voltage of at least one of said secondary winding portions which is associated with each said group has an angle of $\pi/2$ radians with respect to the output voltage of the said group with which it is a part.

23. Means for converting the output of a DC power source to a quasi sinusoidal stepped wave power output, said wave having two $n$ steps in each cycle, $n$ being an odd number, the riser of each step having a chosen amplitude comprising means in circuit with said source for generating $n$ square wave voltages having like frequencies and being $180/n$ degrees displaced in phase with respect to each other, $n$ power inverters, means for applying the output of said DC source and a respective one of said square wave voltages to each of said power inverters, one of said inverters responsive to its applied DC source output and applied respective square wave voltages for deriving an output having the amplitude of the initial step of a cycle of said stepped wave, respective pairs of the other power inverters responsive to their respective DC source outputs and their applied respective square wave voltages for deriving first and second outputs which are equal to each other and equal to one half the amplitude of the riser of a chosen step in said stepped wave, and means for vectorially combining said derived outputs in a phase relationship such that the initial portion of one half cycle and having the width of a step of the initial step power inverter output is combined with said first outputs in one polarity and with said second outputs in the opposite polarity, said second outputs having respectively half the amplitudes of the risers of succeeding steps are timed to change polarity at their corresponding steps, said initial step outputs are timed to change polarity at the first step of the next half cycle, and said first outputs are timed to change polarity at their corresponding steps respectively immediately preceding the change of polarity of said initial step output.

24. An arrangement for inverting a unidirectional wave into an alternating wave of a predetermined frequency comprising at least 3 wave generators, each of said generators producing a square shaped output wave of said predetermined frequency, means combining the output waves of said generators to produce a resulting wave of stepped configuration, means for differently dimensioning the time occurrence of each of said square waves so that the discontinuities in the form of said resulting wave occur at selected integral multiples of a given electrical angle, and means for dimensioning the change in amplitude of said resulting wave at times corresponding to the occurrence of each discontinuity to be proportional to the cosine of the electrical angle corresponding to the time of occurrence of each such discontinuity.

25. An arrangement for inverting unidirectional potential into three phase alternating potential of a predetermined frequency comprising first, means for producing a first resulting voltage wave of stepped configuration, said first means comprising a first plurality of voltage generators, each of said generators producing a square shaped output voltage wave of said predetermined frequency, means combining the output waves of said generators to produce said first resulting voltage wave of stepped configuration, means for differently dimensioning the time occurrence of each of said square waves so that the discontinuities in said first resulting wave occur at selected integral multiples of a given electrical angle, and means for dimensioning the change in amplitude of said resulting wave at times corresponding to the occurrence of each discontinuity to be proportional to the cosine of the electrical angle corresponding to the time of occurrence of each such discontinuity, second means and third means for producing respectively second and third resulting voltage waves of stepped configuration identical to said first resulting voltage wave, and means for providing a phase displacement of 120 electrical degrees between said first, second and third resulting waves.

References Cited

UNITED STATES PATENTS

| | | | |
|---|---|---|---|
| 3,241,038 | 3/1966 | Amato | 321—44 |
| 1,971,730 | 8/1934 | Proctor | 307—107 |
| 2,239,437 | 4/1951 | Bedford | 321—36 |
| 2,824,274 | 2/1958 | Holt | 321—27 |
| 2,912,634 | 11/1959 | Peoples | 321—5 |
| 3,002,142 | 9/1961 | Jensen | 307—106 |
| 3,091,729 | 5/1963 | Schmidt | 321—5 |
| 3,100,851 | 8/1963 | Ross et al. | 307—107 |
| 3,136,957 | 6/1964 | Putkovich et al. | 321—5 X |

FOREIGN PATENTS 1,080,212  4/1960  Germany.

OTHER REFERENCES

Synchronized Inverter Has 3-Phase Output, Electronic Equipment Engineering, May 1960, pp. 18 and 19 relied upon.

Radiotron Designer's Handbook, Langford-Smith, 4th edition, Wireless Press, 1953, p. 301.

Static Inverter Delivers Regulated 3-Phase Power by M. Libienstein, published in Electronics, July 8, 1960, vol. 33, No. 28, pp. 55–59.

LEE T. HIX, Primary Examiner

G. GOLDBERG, Assistant Examiner

U.S. Cl. X.R.

307—77, 82, 107, 227, 261; 321—9, 27, 44

UNITED STATES PATENT OFFICE
CERTIFICATE OF CORRECTION

Patent No. 3,491,282        Dated January 20, 1970

Inventor(s) Theodore M. Heinrich and Andreas Kernick

It is certified that error appears in the above-identified patent and that said Letters Patent are hereby corrected as shown below:

In the Specification, column 1, lines 40 through 43 should read: "Fig. 4 is a view similar to Fig. 1 showing the component voltages and the combined voltage shape of another output phase;"

In the Claims, column 27, line 25 after $(1-\cos \emptyset)$ insert -- $(\cos \theta_x)$ --; line 46 "$Mx = (1 \cos \pi/N) \cos (\theta_x)$" should read -- $M_x = (1-\cos \pi/N) \cos (\theta_x)$ --; and line 64 "effective" should read -- ineffective --.

Signed and sealed this 12th day of November 1974.

(SEAL)
Attest:

McCOY M. GIBSON JR.           C. MARSHALL DANN
Attesting Officer              Commissioner of Patents